US008736581B2

(12) United States Patent
Han et al.

(10) Patent No.: US 8,736,581 B2
(45) Date of Patent: *May 27, 2014

(54) TOUCH SENSING WITH FRUSTRATED TOTAL INTERNAL REFLECTION

(75) Inventors: Jefferson Y. Han, Holliswood, NY (US); Joel S. Kollin, Seattle, WA (US); David Elliott Slobodin, Lake Oswego, OR (US)

(73) Assignee: Perceptive Pixel Inc., New York, NY (US)

( * ) Notice: Subject to any disclaimer, the term of this patent is extended or adjusted under 35 U.S.C. 154(b) by 679 days.

This patent is subject to a terminal disclaimer.

(21) Appl. No.: 12/757,937

(22) Filed: Apr. 9, 2010

(65) Prior Publication Data

US 2010/0302210 A1    Dec. 2, 2010

Related U.S. Application Data

(60) Provisional application No. 61/182,984, filed on Jun. 1, 2009.

(51) Int. Cl.
*G06F 3/042* (2006.01)
*G06F 3/03* (2006.01)

(52) U.S. Cl.
CPC .... *G06F 3/0421* (2013.01); *G06F 2203/04109* (2013.01); *G06F 3/0425* (2013.01); *G06F 2203/04808* (2013.01); *G06F 3/0317* (2013.01)
USPC ........ 345/175; 345/174; 345/176; 178/18.09; 250/221

(58) Field of Classification Search
CPC .................. G06F 2203/04109; G06F 3/0421; G06F 3/0425; G06F 2203/04808; G06F 3/0317
USPC ................ 345/174–176; 178/18.09; 250/221
See application file for complete search history.

(56) References Cited

U.S. PATENT DOCUMENTS

| 3,200,701 A | 8/1965 | Wyman |
| 3,673,327 A | 6/1972 | Johnson et al. |

(Continued)

FOREIGN PATENT DOCUMENTS

| JP | 62-107325 | 5/1987 |
| JP | 8-50526 | 2/1996 |

(Continued)

OTHER PUBLICATIONS

Boual, Sophie; Large, Timothy; Buckingham, Mark; Travis, Adrian; Munford, Simon, "Wedge Displays as Cameras," 2006 Society for Information Display (SID) International Symposium Digest of technical Papers, pp. 1999-2002 (2006).

(Continued)

*Primary Examiner* — Gregory J Tryder
*Assistant Examiner* — Peter D McLoone
(74) *Attorney, Agent, or Firm* — Glen Johnson; Micky Minhas

(57) ABSTRACT

A touch-screen device includes a radiation source, a waveguide configured to receive radiation emitted by the source and to cause some of the radiation to undergo total internal reflection within the waveguide, a pliable frustrating layer disposed relative to the waveguide to enable the frustrating layer to contact the waveguide when the frustrating layer is physically deformed, the frustrating layer being configured to cause frustration of the total internal reflection of the received radiation within the waveguide when the frustrating layer is physically deformed to contact the waveguide such that some of the received escapes from the waveguide at the contact point, an imaging sensor configured to detect some of the radiation that escapes from the waveguide, and a structure disposed relative to the frustrating layer, the structure configured to steer at least a portion of the radiation that escapes from the waveguide toward the imaging sensor.

39 Claims, 14 Drawing Sheets

(56) References Cited

U.S. PATENT DOCUMENTS

| | | | |
|---|---|---|---|
| 3,846,826 A | | 11/1974 | Mueller |
| 4,134,063 A | | 1/1979 | Nicol et al. |
| 4,346,376 A | * | 8/1982 | Mallos .......................... 345/176 |
| 4,484,179 A | * | 11/1984 | Kasday ......................... 345/176 |
| 4,542,375 A | * | 9/1985 | Alles et al. ................... 345/176 |
| 4,668,861 A | | 5/1987 | White |
| 5,942,761 A | | 8/1999 | Tuli |
| 5,973,844 A | | 10/1999 | Burger |
| 6,323,846 B1 | | 11/2001 | Westerman et al. |
| 6,323,892 B1 | | 11/2001 | Mihara |
| 6,883,919 B2 | | 4/2005 | Travis |
| 6,895,164 B2 | | 5/2005 | Saccomanno |
| 6,972,753 B1 | | 12/2005 | Kimura et al. |
| 6,997,558 B2 | | 2/2006 | Perlin et al. |
| 7,302,152 B2 | | 11/2007 | Luther et al. |
| 7,330,629 B2 | | 2/2008 | Cooke et al. |
| 7,351,949 B2 | | 4/2008 | Oon et al. |
| 7,394,058 B2 | | 7/2008 | Chua et al. |
| 7,410,286 B2 | | 8/2008 | Travis |
| 7,412,119 B2 | | 8/2008 | Smits |
| 8,144,271 B2 | * | 3/2012 | Han ................................ 349/12 |
| 8,259,240 B2 | * | 9/2012 | Han ................................ 349/12 |
| 8,624,853 B2 | * | 1/2014 | Han et al. ....................... 345/173 |
| 2003/0210537 A1 | | 11/2003 | Engelmann |
| 2004/0071417 A1 | | 4/2004 | Veligdan |
| 2005/0068537 A1 | | 3/2005 | Han et al. |
| 2005/0200293 A1 | | 9/2005 | Naugler et al. |
| 2006/0022956 A1 | | 2/2006 | Lengeling et al. |
| 2006/0026521 A1 | | 2/2006 | Hotelling et al. |
| 2006/0026535 A1 | | 2/2006 | Hotelling et al. |
| 2006/0026536 A1 | | 2/2006 | Hotelling et al. |
| 2006/0033724 A1 | | 2/2006 | Chaudhri et al. |
| 2006/0053387 A1 | | 3/2006 | Ording |
| 2006/0085757 A1 | | 4/2006 | Andre et al. |
| 2006/0086896 A1 | | 4/2006 | Han |
| 2006/0188196 A1 | | 8/2006 | Charters et al. |
| 2006/0227120 A1 | | 10/2006 | Eikman |
| 2006/0279558 A1 | | 12/2006 | Van Delden et al. |
| 2007/0070050 A1 | | 3/2007 | Westerman et al. |
| 2007/0084989 A1 | * | 4/2007 | Lange et al. ................... 250/221 |
| 2007/0152985 A1 | * | 7/2007 | Ostergaard et al. ............ 345/176 |
| 2008/0007540 A1 | | 1/2008 | Ostergaard .................... 345/176 |
| 2008/0007542 A1 | * | 1/2008 | Eliasson et al. ............... 345/176 |
| 2008/0029691 A1 | * | 2/2008 | Han ................................ 250/224 |
| 2008/0150913 A1 | | 6/2008 | Bell et al. |
| 2008/0179507 A2 | | 7/2008 | Han |
| 2008/0192025 A1 | | 8/2008 | Jaeger et al. |
| 2008/0284925 A1 | | 11/2008 | Han |
| 2009/0033637 A1 | | 2/2009 | Han |
| 2009/0122020 A1 | * | 5/2009 | Eliasson et al. ............... 345/173 |
| 2009/0128499 A1 | * | 5/2009 | Izadi et al. ..................... 345/173 |
| 2010/0302185 A1 | | 12/2010 | Han |
| 2010/0302196 A1 | * | 12/2010 | Han et al. ....................... 345/173 |
| 2010/0302210 A1 | * | 12/2010 | Han et al. ....................... 345/175 |
| 2012/0182266 A1 | * | 7/2012 | Han ................................ 345/175 |
| 2012/0268427 A1 | * | 10/2012 | Slobodin ........................ 345/175 |

FOREIGN PATENT DOCUMENTS

| | | |
|---|---|---|
| JP | 10-162698 | 6/1998 |
| JP | 200494569 | 3/2004 |
| JP | 2006318512 | 11/2006 |
| WO | 0172037 | 9/2001 |
| WO | 02/45413 A1 | 6/2002 |
| WO | 2005/029395 A2 | 3/2005 |
| WO | 2005029172 | 3/2005 |
| WO | 2010141453 | 4/2005 |
| WO | 2006/044652 A1 | 4/2006 |
| WO | 2006/082444 A2 | 8/2006 |
| WO | 2007/003196 A2 | 1/2007 |
| WO | 2007/008766 A1 | 1/2007 |
| WO | 2008017077 | 2/2008 |
| WO | 2009018317 | 2/2009 |
| WO | 2009020940 | 2/2009 |
| WO | 2010141372 | 12/2010 |
| WO | 2010141380 | 12/2010 |

OTHER PUBLICATIONS

Non-final Office Action issued in U.S. Appl. No. 11/833,908, mailed Sep. 13, 2010, 49 pages.

Non-final Office Action issued in U.S. Appl. No. 12/185,782, mailed Jan. 12, 2011, 14 pages.

International Search Report dated Oct. 20, 2008 from WO08/017077, 3 pages.

International Search Report dated Feb. 19, 2009 from WO09/020940, 2 pages.

International Search Report dated Jan. 29, 2009 from WO09/018317, 2 pages.

Anonymous: "Anti-reflective coating", Wikipedia, Feb. 6, 2009, retrieved from the Internet: http://replay.waybackmachine.org/20090206235736//http://en.widipedia.org/wiki/Anti-reflective_coating (retrieved on Mar. 30, 2011), 6 pages.

Taira, Y., et al., "Low-Power LCD Using a Novel Optical System", 2002 SID International Symposium Digest of Technical Papers, Boston, MA, May 21-23, 2002, 3 pages.

International Search Report and Written Opinion dated Apr. 28, 2011 from WO10/141371, 10 pages.

International Search Report and Written Opinion dated Mar. 1, 2011 from WO10/141308, 7 pages.

International Search Report and Written Opinion dated Apr. 28, 2011 from WO10/141453, 8 pages.

Buxton, W., Hill, R., and Rowley P., "Issues and Techniques in Touch-Sensitive Tablet Input," Proceedings of the 12th Annual Conference on Computer Graphics and Interactive Techniques SIGGRAPH '85. ACM Press, New York, NY, 215-224 (1985).

Han, Jefferson Y., "Low-Cost Multi-Touch Sensing Through Frustrated Total Internal Reflection," Media Research Laboratory, (New York University; Oct. 23-27, 2005; Seattle, Washington), 115-118.

Lee, S., Buxton, W. and Smith, K.C., "A Multi-Touch Three Dimensional Touch-Sensitive Tablet," Proceedings of the SIGCHI Conference on Human Factors in Computing Systems (San Francisco, CA, USA), CHI '85. ACM Press, New York, NY 21-25 (1955).

Malik, S and Laszio, J., "Visual Touchpad: A Two-Handed Gestural Input Device," Proceedings of the 6th International Conference on Multimodal Interfaces (State College, PA USA, Oct. 13-15, 2004), ICMI '04. ACM Press, New York, NY 289-296 (2004), 8 pgs.

Matsushita, N. and Rekimoto, J., "HoloWall: Designing a Finger, Hand, Body and Object Sensitive Wall," Proceedings of the 10th Annual ACM Symposium on User Interface Software and Technology (Banff, Alberta, Canada, Oct. 14-17, 1997), UIST '97. ACM Press, New York, NY 209-210 (1997).

Rekimoto, J., "SmartSkin: An Infrastructure for Freehand Manipulation on Interactive Surfaces," Proceedings of the SIGCHI Conference on Human Factors in Computing Systems, CHI '02. ACM Press, New York, NY 113-120 (2002), 8 pgs.

Westerman, W., Elias, J.G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, MN, Oct. 2001), 632-636 (2001).

Wilson, A.D., "TouchLight: An Imaging Touch Screen and Display for Gesture-Based Interaction," Proceedings of the 6th International Conference on Multimodal Interfaces (State College, PA USA, Oct. 13-15, 2004), ICMI '04. ACM Press, New York, NY (2004), 6 pgs.

* cited by examiner

TOUCH SENSING WITH FRUSTRATED TOTAL INTERNAL REFLECTION

CROSS-REFERENCE TO RELATED APPLICATIONS

This application claims the benefit under 35 U.S.C. §119(e) of U.S. Application No. 61/182,984 entitled "Touch Sensing," filed Jun. 1, 2009, which is incorporated herein by reference in its entirety.

TECHNICAL FIELD

This disclosure relates to touch sensing.

BACKGROUND

Touch sensitive systems refer, in general, to systems that detect and respond to multiple simultaneous points of contact on a surface. Typically, a touch sensitive system is incorporated within an electronic device in the form of a touch screen display that allows a user to both view and manipulate objects using one or more inputs that are in contact with the screen. Examples of electronic devices in which a touch sensitive system has been used include computer tablets, personal digital assistants (PDA), and cell-phones, among others. A variety of techniques are available that enable touch sensitive systems. For example, some touch systems identify surface contact by detecting changes in heat, pressure, capacitance or light intensity.

SUMMARY

This specification describes technologies relating to touch sensing. In general, one aspect of the subject matter described in this specification can be embodied in a touch-screen device that includes: a radiation source; an optical waveguide configured to receive radiation emitted by the radiation source and to cause at least some of the received radiation to undergo total internal reflection within the optical waveguide; a pliable frustrating layer disposed relative to the optical waveguide so as to enable the pliable frustrating layer to contact the optical waveguide when the pliable frustrating layer is physically deformed, in which the pliable frustrating layer is configured to: cause frustration of the total internal reflection of the received radiation within the optical waveguide at a contact point between the pliable frustrating layer and the optical waveguide when the pliable frustrating layer is physically deformed to contact the optical waveguide such that some of the received radiation undergoing total internal reflection within the optical waveguide escapes from the optical waveguide at the contact point; an imaging sensor configured to detect at least some of the radiation that escapes from the optical waveguide; and a structure disposed relative to the frustrating layer, in which the structure is configured to steer at least a portion of the radiation that escapes from the optical waveguide toward the imaging sensor.

This and other implementations may optionally include one or more of the following features. In some implementations, the structure includes a diffraction pattern that corresponds to a grating structure. In some cases, the diffraction pattern may be formed by employing an interference pattern that is transferred to the structure, in which a series of fringes representing intensity minima or maxima of the transferred interference pattern correspond to the grating structure. The grating structure may include a blazed grating profile, square-wave profile, 1-bit binary diffraction grating profile, a sinusoidal profile, and/or a half-sinusoidal profile. The square-wave profile may include a multiple-bit modulated binary profile.

In some implementations, the structure includes a diffraction pattern in which a series of fringes representing intensity minima or maxima of an interference pattern transferred to the structure are arranged in an aperiodic pattern and/or in which fringes of the interference pattern form planes that are aligned substantially parallel with a surface of the frustrating layer on which the radiation is incident.

In certain implementations, the structure is on a surface of the frustrating layer that is furthest from the waveguide. Alternatively, or in addition, the structure is on a surface of the frustrating layer that is nearest to the waveguide.

In some implementations, the structure includes a reflective layer that is reflective to radiation that escapes from the optical waveguide. The reflective layer may transmit visible light.

In certain implementations, the device also includes a cladding layer on the frustrating layer. In some cases, the device includes a cladding layer on the structure. Portions of the cladding layer may be located within grooves defined by the structure.

In some implementations, the radiation source is configured to emit infrared light.

In certain implementations, the structure is configured to steer by diffraction at least a portion of the radiation that escapes from the optical waveguide toward the imaging sensor. In some cases, the structure is configured to steer by refraction at least a portion of the radiation that escapes from the optical waveguide toward the imaging sensor. The structure may include an array of prisms.

In some implementations, the structure is divided into sub-structures and each sub-structure is configured to steer radiation that escapes from the optical waveguide toward the imaging sensor.

In certain implementations, the touch-screen device further includes a display device adjacent to the optical waveguide. The touch-screen device may include a coupling layer, in which the coupling layer is in contact with a side of the display device that is furthest from the optical waveguide and in which the coupling layer is configured to couple radiation out of the display device. The display device may include the imaging sensor. The imaging sensor may be embedded in the display device. In some implementations, the touch screen device also includes a projection screen layer, in which the projection screen layer includes a structure configured to diffuse at least a portion of light emitted from the display device. In certain implementations, the touch-screen device includes a projection screen layer and a structure configured to diffuse at least a portion of light emitted from the display device on to the projection screen layer.

In some implementations, the touch-screen device includes a light emitting diode adjacent to the optical waveguide. The light emitting diode may be an organic light emitting diode. The touch-screen device may include a coupling layer, in which the coupling layer is in contact with a side of the OLED that is furthest from the optical waveguide and in which the coupling layer is configured to couple radiation out of the OLED.

In some implementations, the touch-screen device includes multiple imaging sensors, in which each imaging sensor is configured to detect at least some of the radiation that escapes from the optical waveguide.

Another aspect of the subject matter described in this specification may be embodied in a touch-screen device that includes: a radiation source; an optical waveguide configured to receive radiation emitted by the radiation source and to cause at least some of the received radiation to undergo total internal reflection within the optical waveguide; a pliable frustrating layer disposed relative to the optical waveguide so as to enable the pliable frustrating layer to contact the optical waveguide when the pliable frustrating layer is physically deformed, in which the pliable frustrating layer is configured to: cause frustration of the total internal reflection of the received radiation within the optical waveguide at a contact point between the pliable frustrating layer and the optical waveguide when the pliable frustrating layer is physically deformed to contact the optical waveguide such that some of the received radiation undergoing total internal reflection within the optical waveguide escapes from the optical waveguide at the contact point; and a structure disposed relative to the frustrating layer, in which the structure is configured to: redirect at least a portion of the radiation that escapes from the optical waveguide back into the waveguide at an angle that enables the reflected radiation to undergo total internal reflection in the optical waveguide.

This and other implementations may optionally include one or more of the following features. For example, in some implementations, the device further includes an imaging sensor disposed adjacent to a side of the optical waveguide, in which the imaging sensor is configured to detect at least some of the radiation that is redirected back into the optical waveguide.

In some implementations, the touch-screen device includes an image generating layer disposed adjacent to a bottom surface of the optical waveguide that is opposite to a top surface of the optical waveguide, in which the image generating layer has a top surface facing the bottom surface of the optical waveguide and a bottom surface that is opposite from the top surface of the image generating layer and the image generating layer is configured to emit output images towards the optical waveguide and pliable frustrating layer and to be transmissive to radiation emitted by the radiation source. The image generating layer may include a liquid crystal device. The image generating layer may include a light emitting diode. The light emitting diode may be an organic light emitting diode.

Another aspect of the subject matter described in this specification may be embodied in a touch-screen device that includes: a radiation source; an optical waveguide configured to receive radiation emitted by the radiation source and to cause at least some of the received radiation to undergo total internal reflection within the optical waveguide; a pliable frustrating layer disposed relative to the optical waveguide so as to enable the pliable frustrating layer to contact the optical waveguide when the pliable frustrating layer is physically deformed, the pliable frustrating layer being configured to: cause frustration of the total internal reflection of the received radiation within the optical waveguide at a contact point between the pliable frustrating layer and the optical waveguide when the pliable frustrating layer is physically deformed to contact the optical waveguide such that some of the received radiation undergoing total internal reflection within the optical waveguide escapes from the optical waveguide at the contact point; and an imaging sensor configured to detect at least some of the radiation that escapes from the optical waveguide, in which the frustrating layer includes a structure configured to steer at least a portion of the radiation that escapes from the optical waveguide toward the imaging sensor.

This and other implementations may optionally include one or more of the following features. For example, in some implementations, the structure may include a diffraction pattern corresponding to a grating structure. The grating structure may be selected from the group consisting of a blazed grating profile, a square-wave profile, a 1-bit binary diffraction grating profile, a multiple-bit modulated binary profile, a sinusoidal profile, and a half-sinusoidal profile.

The structure may include an aperiodic diffraction pattern. The structure may include a diffraction pattern in which planes of refractive index variation are aligned substantially parallel with a surface of the frustrating layer on which the radiation is incident.

In some implementations, the touch-screen device includes a cladding layer on the frustrating layer. In some cases, the radiation source may be configured to emit infrared light. In certain implementations, the structure may be configured to steer by diffraction at least a portion of the radiation that escapes from the optical waveguide toward the imaging sensor.

In some implementations, the touch-screen device includes a display device adjacent to the optical waveguide. The display device may be a liquid crystal device. The display device may be a light emitting diode device, such as an organic light emitting diode device.

In certain implementations, the touch-screen device includes a multiple imaging sensors, each imaging sensor being configured to detect at least some of the radiation that escapes from the optical waveguide. In some implementations, the display device includes the imaging sensor. The imaging sensor may be embedded in the display device. In some implementations, the structure is further configured to diffuse at least a portion of light emitted from the display device.

The details of one or more implementations are set forth in the accompanying drawings and the description below. Other features will be apparent from the description and drawings, and from the claims. The technology described herein can be employed in various implementations including single touch or multi-touch sensitive devices.

DETAILED DESCRIPTION

A touch-sensitive system can receive an input from various sources of contact which include, for example, a human finger, a stylus, and/or a mechanical object. FIGS. 1A-1D are diagrams of a user interacting with a multi-touch sensitive device 100. As illustrated in FIGS. 1A-1D, when a user contacts a touch-screen 102 of device 100 using one or more fingers, the device 100 detects the contact made by the user's finger(s) with the touch-screen 102 and tracks movement(s) made by the user's finger(s) along the surface of the touch-screen 102. Based on a detected path or paths traced by the user's finger(s) on touch-screen 102, device 100 can manipulate information in a corresponding display, whether the display is separate from touch-screen 102 or is integrated as part of touch-screen 102. Given that device 100 can detect contact from multiple inputs, many users may operate device 100 concurrently.

One approach for sensing the contact of one or more objects on a surface of a touch sensitive device involves sensing contact points on a waveguide by detecting points along the waveguide from which light is escaping the waveguide due to frustrated total internal reflectance (FTIR) occurring as a consequence of the contact being made on the waveguide. When light traveling in a first medium (e.g., a waveguide) encounters an interface with a second medium having a lower refractive index (e.g., air), the light traveling in the first medium may, depending on its angle of incidence with the interface, refract as it passes through the interface. If the angle of incidence is greater than a critical angle, on the other hand, the light will undergo total internal reflection (TIR) within the first medium. For example, waveguides such as fiber optic cables employ TIR to transport light efficiently with very little loss. In some cases, however, such total internal reflection of light can be frustrated, despite the angle of incidence, by replacing the medium having the lower refractive index with another material that allows the light to escape from the waveguide. By sensing the escaped light, it may be possible to detect the location at which the new material was introduced.

Implementations of a touch sensitive device disclosed herein include a pliable frustrating layer that is configured to deform responsive to surface manipulation (e.g., pressure from a finger interacting with a display), which causes a portion of the frustrating layer at the location of the surface manipulation to physically contact a waveguide layer thereebeneath. Light that travels along the waveguide, e.g., via total internal reflection, escapes at the point of contact with the frustrating layer to yield a detectable position of the frustrating layer deformation, and hence surface manipulation (i.e., total internal reflection of light in the waveguide is "frustrated" at the point of contact between the waveguide and the frustrating layer).

Figure 1A:
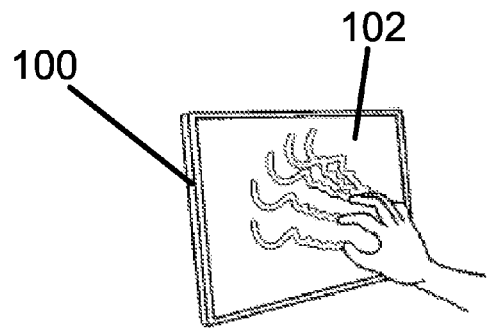
FIGS. 1A through 1D show examples of how a user can interact with a multi-touch sensitive device.
Figure 1B:
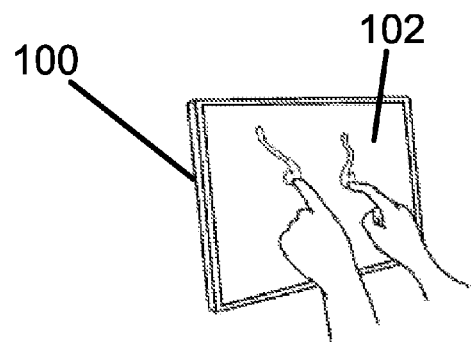
Figure 1C:
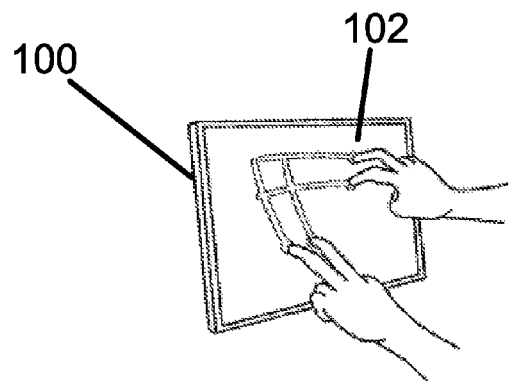
Figure 1D:
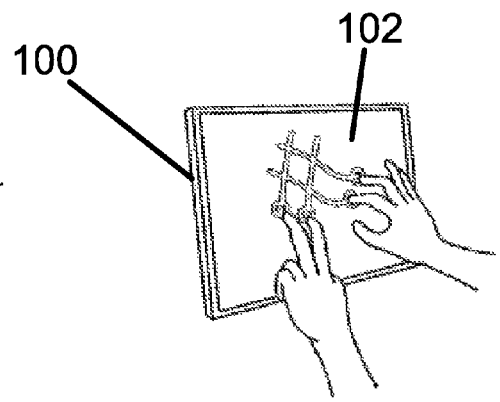
Figure 2A:
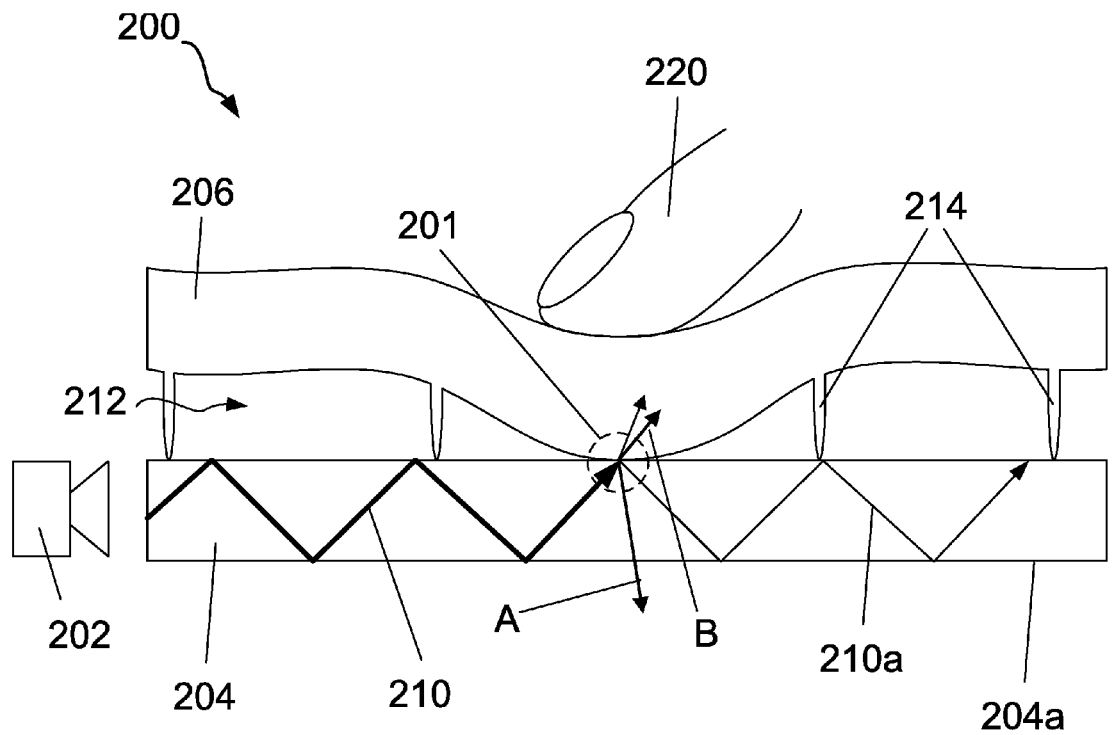
FIGS. 2A and 2B are schematic cross-sectional diagrams of examples of touch sensitive devices.
Figure 2A:
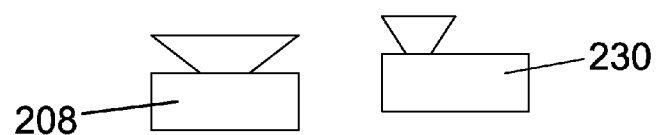

FIG. 2A is a schematic cross-sectional diagram of an example of a touch sensitive device 200, in which a point of contact with device 200 is detected based on FTIR. As shown in the schematic, device 200 includes a radiation source 202, a waveguide 204, a pliable frustrating layer 206 above waveguide 204 and an imaging sensor 208. Pliable frustrating layer 206 is positioned relative to waveguide 204 such that a small gap 212 exists between pliable frustrating layer 206 and waveguide 204. In some implementations, protrusions 214 may be formed on or as part of frustrating layer 206 to maintain the gap 212 between the pliable frustrating layer 206 and the waveguide 204. In such implementations, protrusions 214 (e.g., surface roughness) can be formed integrally with pliable frustrating layer 206, i.e., protrusions 214, together with frustrating layer 206, form a single mass of seamless, contiguous material. In some implementations, protrusions 214 are a result of the micro-roughness that exists on the surface of frustrating layer 206 in which the spacing between protrusions 214 is random or semi-random. In some cases, protrusions 214 are formed from material distinct from frustrating layer 206. For example, glass spacers could be used to separate an acrylic waveguide from a polycarbonate frustrating layer. The spacing between protrusions 214 can be random, pseudo-random or periodic.

Electromagnetic radiation (e.g., infrared (IR) radiation) is emitted from radiation source 202 and coupled into waveguide 204. Due to the refractive index difference between waveguide 204 and the medium surrounding waveguide 204, at least some of the coupled radiation then undergoes TIR and proceeds to travel down waveguide 204. For example, waveguide 204 could be formed from a layer of acrylic surrounded by air. Given the refractive index difference between acrylic (n=1.49) and air (n=1.0), radiation introduced by radiation source 202 into waveguide 204 at an appropriate angle of incidence propagates within and along the acrylic layer by TIR.

In order to frustrate TIR of radiation propagating in waveguide 204, pliable frustrating layer 206 is formed from material that has a refractive index comparable to waveguide 204 and is flexible enough to respond to pressure applied by an input such that sufficient contact can be made with waveguide layer 204. For example, pliable frustrating layer 206 can be formed from relatively pliable materials such as polyvinyl butyral (PVB). Frustrating layer 206 can be formed of other materials including, but not limited to, acrylic/polymethylmethacrylate (PMMA), polyethylene terrephthalate (PET), polycarbonate (PC), polyvinyl chloride (PVC), transparent polyurethane (TPU), or triacetate cellulose (TAC). Thus, when frustrating layer 206 comes into contact with waveguide layer 204, at least a portion of the radiation propagating due to TIR is "frustrated" and escapes from waveguide 204. In some cases, at least a portion 210a of radiation 210 continues to propagate by TIR in waveguide 204, as shown in FIG. 2A. In addition, when integrated as part of a display, frustrating layer 206 may be formed from a material that is transparent to the range of wavelengths emitted by a display light source. For example, PVB is highly transmissive in both the visible and near-infrared regions of the spectrum.

In some implementations, frustrating layer 206 may be configured to have a substantially uniform thickness that is within a range of approximately 100 μm through 300 μm. In selecting an appropriate thickness for frustrating layer 206, the following considerations may be taken into account. If frustrating layer 206 is too thin, it may be difficult to manipulate and handle, for example, during manufacturing. On the other hand, if frustrating layer 206 is too thick, it may cause a parallax issue, where a user perceives a point of contact to be displaced (e.g., by the thickness of frustrating layer 206) from the actual object (produced by a display light source) with which the user is attempting to interact. In alternative implementations, frustrating layer 206 may be configured to be thinner than 100 μm (e.g., about 10 μm or about 30 μm) or thicker than 300 μm (e.g., about 1 mm or about 2 mm).

Due to the presence of air gap 212 between pliable frustrating layer 206 and waveguide 204, little or no frustration of TIR within waveguide 204 occurs absent some external stimulus. However, when pliable frustrating layer 206 is depressed by, for example, a user's finger 220, a portion of pliable frustrating layer 206 contacts waveguide layer 204 in a region 201 (identified by dashed line circle) corresponding to the point of depression. When the portion of pliable frustrating layer 206 contacts waveguide 204, total internal reflection within waveguide 204 is frustrated at region 201, causing at least some radiation to escape from the waveguide 204. It should be noted that although protrusions 214 contact waveguide 204, the area of contact between protrusions 214 and waveguide 204, when no pressure is applied to frustrating layer 206, is relatively small compared to the area of contact between layer 206 and waveguide 204 when frustrating layer 206 is depressed. Accordingly, frustration of TIR that might occur in the regions of contact between protrusions 214 and waveguide 204 is negligible when no pressure is applied to frustrating layer 206.

As shown in FIG. 2A, some of the radiation, represented by arrow "A," escapes from surface 204a of waveguide 204 and proceeds to travel in a direction towards imaging sensor 208.

Imaging sensor 208 images the radiation that escapes from surface 204a. As a result, imaging sensor 208 can discriminately sense, for successive instants of time, points of contact that are sufficiently forceful to deform pliable frustrating layer 206 such that it contacts a substantial portion of waveguide 204 relative to the portion of waveguide 204 contacted by frustrating layer 206 when no pressure is applied. That is, for a "single" point of contact on pliable frustrating layer 206, such as contact by finger 220 shown in FIG. 2A, a single "area" of contact corresponding to the area of pliable frustrating layer 206 that comes into contact with waveguide 204 is discriminately sensed by imaging sensor 208. Likewise, when two or more objects (e.g., two or more fingers of a user) contact and depress pliable frustrating layer 206 concurrently, multiple areas of contact are discriminately (and concurrently) sensed by imaging sensor 208. For ease of discussion, the term "a point of contact" may be used throughout this disclosure to refer more generally to any region or area at which contact is made.

Various detectors may be used as imaging sensor 208 including, but not limited to, charge-coupled devices (CCDs), photo-diodes or complimentary metal-oxide-semiconductor (CMOS) sensors. In some cases, a lens is placed in front of imaging sensor 208 to focus light on sensor 208. Alternatively, or in addition the imaging sensor 208 may include one or more waveguides and/or lenses to assist guiding the incident radiation towards a detection area of a sensing device. The output of imaging sensor 208 is supplied to a suitable computer (not shown) or other electronic device capable of handling various well-known image-processing operations, such as rectification, background subtraction, noise removal, and analysis for each video frame. Machine vision tracking techniques then may be employed by the computer or other electronic device to translate the captured images into discrete touch events and strokes. Such processing may be carried out by any suitable computing system.

In some implementations, touch sensitive device 200 also is combined with a rear-projection source 230 (e.g., a video projector) that is capable of displaying visible images. Accordingly, touch sensitive device 200 can simultaneously function as both a sensing and display device. In implementations where a rear-projection source 230 is used to generate output images, device 200 may be configured to include a diffusive material or layer that is diffusive in the visible spectrum such that the diffusive material or layer may operate as a screen onto which the output images projected by rear-projection source 230 are projected. For example, frustrating layer 206 can include a diffusive layer (e.g., a surface diffusing structure or a volumetric diffusing structure) formed on or within a surface of frustrating layer 206, in which the diffusive layer functions as a projection screen on to which light emitted by a display device, such as rear-projection source 230, is incident so as to form an image. The diffusive layer of the projection screen can be combined either alone or in combination with another diffuser film.

Although FIG. 2A shows projection source 230 arranged alongside imaging sensor 208, projection source 230 also can be disposed at other locations and/or away from imaging sensor 208, generally with the aid of suitable optics devices. As illustrated in FIG. 2A, device 200 may include a single imaging sensor 208 and a single projection source 230. In certain implementations, the distance between imaging sensor 208 and waveguide 204 is large enough such that a field of view of sensor 208 is capable of imaging/detecting radiation escaping from waveguide 204 at substantially any point of contact along the surface of waveguide 204.

Figure 2B:
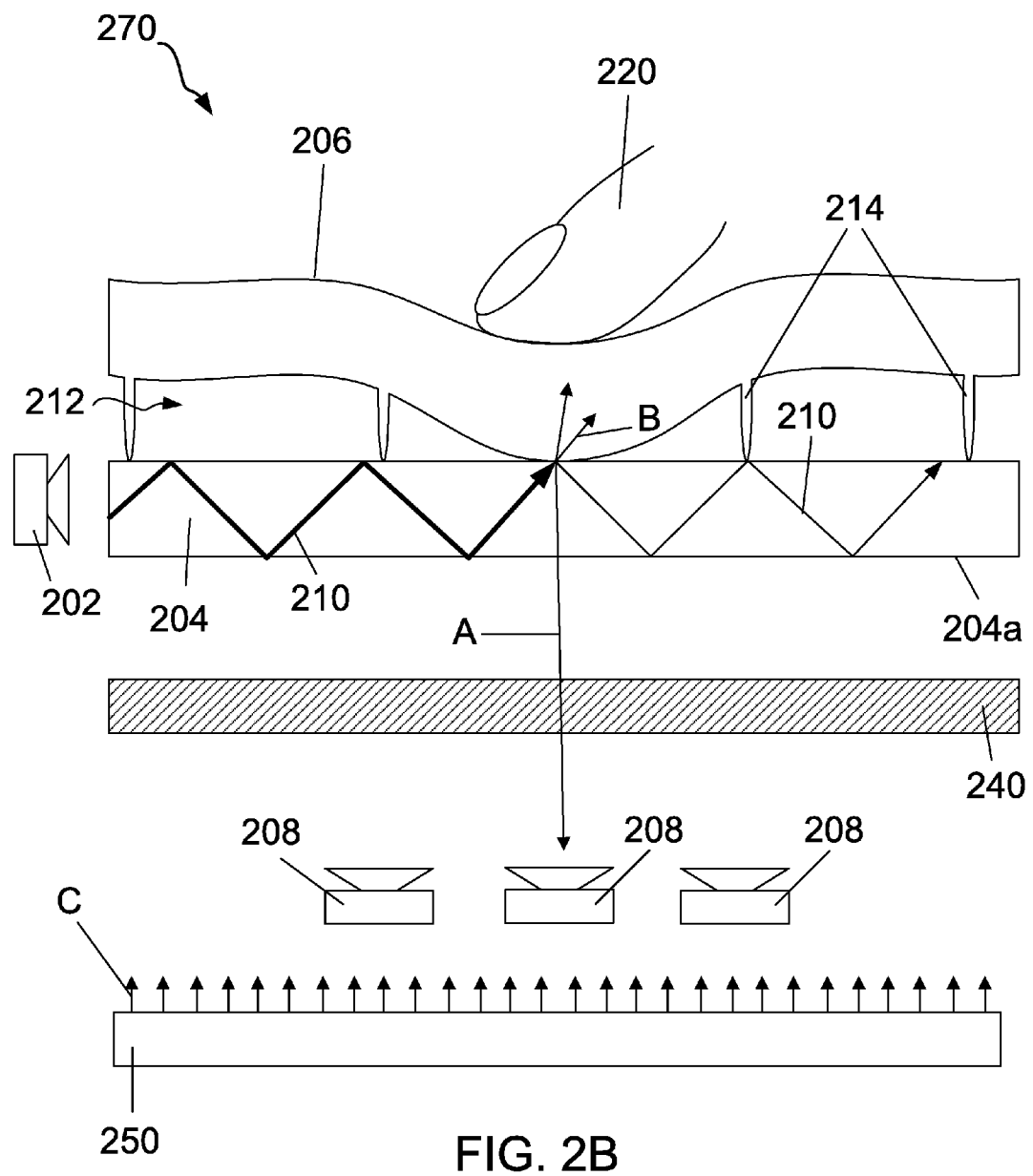

However, in other implementations, multiple projectors can be employed so that different images/videos can be projected onto different respective portions of a display. Alternatively, or in addition, multiple imaging sensors can be employed so that each image sensor has a field of view capable of imaging/detecting radiation escaping from different portions of waveguide 204. For instance, FIG. 2B illustrates one example of the use of multiple imaging sensors 208 within an FTIR-based touch sensitive device. Given the relatively small corresponding field of view, each imaging sensor 208 may be located closer to waveguide 204. Accordingly, in some cases, thinner FTIR-based touch sensitive devices may be manufactured. In implementations of FTIR-based touch sensitive devices containing multiple imaging sensors, the imaging sensors and/or projectors may be spaced apart from one another along a single axis, multiple axes, along a grid system, or other suitable manner.

For example, the imaging sensors can be arranged such that there is no overlap between the field of view of adjacent sensors 208. Alternatively, the imaging sensors can be arranged such that the field of view of at least one sensor 208 overlaps with the field of view of one or more adjacent sensors 208. The output generated by each sensor then may be supplied to a suitable computer (not shown) or other electronic device capable of handling image-processing operations, and modified to form a composite image/data map corresponding to all or substantially all of the area over which points of contact with compliant frustrating layer 206 can be made. The composite image/data map then may be used to determine where along frustrating layer 206 points of contact occur.

Radiation source 202 can include multiple light emitting diodes (LEDs), which are arranged directly against an edge of waveguide 204 so as to maximize coupling of electromagnetic radiation into total internal reflection. Other sources of electromagnetic radiation, such as, for example, laser diodes, may be used instead. In some implementations, source 202 can be selected to emit radiation in the infrared (IR) portion of the electromagnetic spectrum such that it does not interfere with visible radiation if device 200 is integrated into a display.

In some implementations, waveguide 204 is formed from materials that support TIR of infrared light but that also are transparent (or at least transmissive) to the range of wavelengths emitted by a display light source so as to minimize interference with the display. For example, waveguide 204 can be formed from materials including glass or plastics such as acrylic. Waveguide 204 also can be formed from materials including, but not limited to, PMMA, PC, PVC, PVB, TPU, or PET. Locally depressing frustrating layer 206 may cause substantial local deformation of waveguide layer 204 or frustrating layer 206 as frustrating layer 206 comes into contact with waveguide layer 204. In contrast, portions of waveguide layer 204 or frustrating layer 206 far from the region of contact between waveguide 204 and frustrating layer 206 may experience little or no deformation. Such pronounced local deformation may lead to an increase in the area of physical contact between compliant frustrating layer 206 and waveguide layer 204, thereby causing an increased amount of IR to escape from waveguide 204 in the region of the point of contact. In some cases, the edges of waveguide 204 are polished to maximize TIR coupling of radiation from source 202.

In some implementations, waveguide 204 may be configured to have a substantially uniform thickness that is within a range of approximately 0.5 mm through 20 mm. In selecting an appropriate thickness for waveguide 204, the following considerations may be taken into account. In some cases, if waveguide 204 is too thin, it may not provide a sufficiently rigid surface, e.g., the waveguide may bend excessively with typical contact force expected to be applied to touch-sensitive device 200 during use. Alternatively, or in addition, an insufficient amount of light may be coupled into the waveguide In some cases, if waveguide 204 is too thick, this may lead to an increase in the weight and cost of touch-sensitive device 200. Alternatively, or in addition, the touch-view parallax is excessive.

In some implementations, a liquid crystal display (LCD) technology or light emitting diode (LED) display technology, which includes organic light emitting diode (OLED) display technology, may be used to generate output display images instead of rear projection technology. Employing an LCD or LED display technology instead of rear projection technology and backlight enables, in some implementations, a touch-sensitive device that has reduced volume and thickness compared to a device which utilizes projector technology. Using either LED, OLED or LCD panels also may increase portability. Such "thin-panel" touch-sensitive systems can be used in laptop screens, flat-panel displays, PDA's and cell phones, among other devices. LCD panels, LED and OLED arrays can be used as the light source in any of the examples and implementations described herein.

For example, FIG. 2B is a schematic diagram of a cross-section of a touch sensitive device 270 that employs an LCD panel 240 and backlight 250 to generate a visible display. As illustrated in FIG. 2B, LCD panel 240 and backlight 250 are disposed beneath waveguide layer 204. In some implementations, LCD panel 240 is arranged so that it is fixed to a bottom surface of waveguide layer 204.

Although not shown, LCD panel 240 may include one or more components or layers such as, for example, a liquid crystal layer, a color filter layer, a polarizer layer, an electrode layer, and a substrate layer (e.g., a glass substrate). Other layers or components can be included as well. Similarly, LED and OLED panels can include, but are not limited to, one or more layers or components, such as a light emitting diode layer, an electrode layer, an encapsulant/adhesive layer and a substrate layer (e.g., a glass substrate).

Individual pixel portions within LCD panel 240 can be configured to block or transmit visible light, represented by arrows "C," emitted by backlight 250 in order to display an image. Furthermore, LCD panel 240 may be transparent to infrared light so that infrared light that escapes from surface 204a of waveguide 204 passes through LCD panel 240 and can be imaged by imaging sensor 208.

In some implementations, LEDs (or OLEDs) can be used as the light source in FTIR-based touch sensitive devices Because LEDs (OLEDs) themselves are emissive elements, in implementations in which LEDs (OLEDs) are used to generate output images, there may be no need for a backlight (e.g., backlight 250). Similar to LCD panel 240, such LEDs (OLEDs) may be transparent to infrared light and may be arranged in a layer that is bonded to waveguide layer 204.

In some implementations, the display device can include one or more image sensors 208 as part of the display device (e.g., image sensors 208 may be embedded on or within the display device). In some cases, LCD panel 240 may include photosensors alternating with thin film transistors that drive the liquid crystal cells of LCD panel 240. The photosensors may be made of photodiodes that are sensitive to IR light such as, for example, amorphous hydrogenated silicon germanium, a-SiGe:H photodiodes. The bandgap of such sensors is about 1.45 eV and could be used to detect light having a wavelength of approximately 850 nm. Alternatively, the photodiode material may have a bandgap tuned to match the wavelength of the source radiation. Given that the thin film transistors may also use an amorphous semiconductor, the photosensors can, in some implementations, be located on the same substrate that is used to support the thin film transistors. In order to detect primarily IR light as opposed to visible light, the photosensors may be covered with a filter that passes light in the IR wavelength range while reflecting or absorbing light having different wavelengths. An advantage of the foregoing implementation is that it enables touch sensitive devices that are thinner than devices that use discrete cameras situated beneath and apart from the display device. Other display devices also may include embedded photosensors. For example, an active matrix OLED device may include IR photodiodes alternating with OLED cells.

Figure 2C:
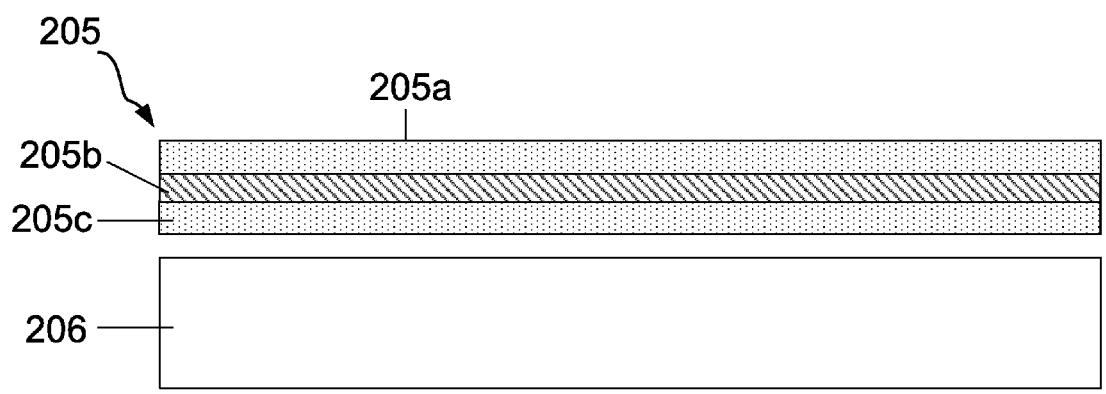
FIG. 2C is a schematic cross-sectional diagram of an example of a cladding layer.

In some implementations, touch-sensitive devices 200 as shown in FIGS. 2A and 2B can include a cladding layer positioned on or above a surface of frustrating layer 206. FIG. 2C is a cross-sectional schematic of an example of a cladding layer 205 positioned above a frustrating layer 206 of touch-sensitive device as described with regard to FIG. 2A or 2B. Cladding layer 205 may protect frustrating layer 206 from damage and/or contamination when frustrating layer 206 is contacted by an object such as a finger or stylus. When integrated as part of a display, cladding layer 205 also is transparent (or at least transmissive) to the range of wavelengths emitted by a display light source.

As shown in the example of FIG. 2C, cladding layer 205 may include an anti-glare layer 205a, an infrared (IR) filter 205b and a non-wetting layer 205c. IR filter layer 205b functions filters out ambient IR light incident on touch-sensitive device 200 so as to reduce (e.g., prevent) occurrences in which image sensors 208 detect ambient IR light and erroneously detect contact with device 200. An example of material that can be used in an IR filter layer includes CLEARAS, commercially available from Sumitomo Osaka Cement Co., Ltd. Anti-glare layer 205a is a scratch-resistant, low friction film disposed on a top surface of IR filter layer 205b. A film that can be used as an anti-glare layer includes, for example, a textured polyester film such as AUTOTEX, which is commercially available from MacDermid Inc.

In some cases, substantial regions of cladding layer 205 may contact frustrating layer 206 such that cladding layer 205 appears to "wet" frustrating layer. Such regions of "wetting" may alter the amount of visible light that is reflected between frustrating layer 206 and cladding layer 205, resulting in portions of touch-sensitive device 200 that appear as blotches when dark images are displayed. By forming anti-wetting layer 205c on a bottom surface of IR filter layer 205b, however, the size and number of wetting regions may be reduced. Similar to anti-glare layer 205a, anti-wetting layer 205c also may be a polyester film, such as AUTOTEX. In some cases, a surface frustrating layer 206 is sufficiently rough such that it is not necessary to include an anti-wetting layer 205c in cladding layer 205. Alternatively, in some cases, cladding layer 205 can be formed of a single film of polytetrafluoroethylene (PTFE) or acrylic film.

The films in cladding layer 205 may be bonded together using, for example, an optical adhesive. In the example of FIG. 2C, an air gap exists between cladding layer 205 and frustrating layer 206. The air gap between cladding layer 205 and frustrating layer 206 may be maintained using, for example, the surface roughness of the bottom surface of cladding layer 205 (e.g., surface roughness of the non-wetting layer 205c) or the surface roughness of frustrating layer 206.

As illustrated in FIGS. 2A and 2B, radiation that escapes waveguide 204, due to FTIR when frustrating layer 206 contacts waveguide 204, may travel in many different directions due to, for example, the surface texture of frustrating layer 206, bulk scattering within frustrating layer 206, or incomplete contact between waveguide 204 and frustrating layer 206. For instance, some of the radiation that escapes may travel in a direction towards frustrating layer 206, as shown by arrow "B" in FIG. 2B (and in FIG. 2A), while some of the radiation may travel away from frustrating layer 206, as shown by arrow "A" in FIG. 2B (and in FIG. 2A). If the refractive indices of frustrating layer 206 and waveguide 204 are comparable, then a portion of radiation traveling will escape in a direction that is parallel or substantially parallel (e.g., within 10° or less, 20° or less, 30° or less, or 45° or less, depending on the difference in index of refraction between frustrating layer 206 and waveguide 204) to a direction the radiation was traveling in waveguide 204 just prior to frustration of TIR, as shown by arrow "B" in FIG. 2B (and in FIG. 2A). As a result, a portion of the escaped radiation may never reach imaging sensor 208. One approach to enable capture of a sufficient amount of light from the frustrated TIR light to detect a point of contact, despite the large fraction of escaped radiation that may never be imaged by imaging sensor 208, may be to increase the intensity of the radiation injected into waveguide 204. This approach, however, may cause operating efficiency to be diminished. Therefore, an alternative approach may be to configure frustrating layer 206 to collect and/or steer at least a portion of radiation that escapes waveguide 204 toward imaging sensor 208.

In implementations in which compliant frustrating layer 206 is configured to collect and/or steer radiation (that escapes waveguide 204 and that is incident on frustrating layer 206) toward imaging sensor 208, frustrating layer 206 may be configured to steer escaped radiation within a range of angles such that the escaped radiation is steered towards a position on the imaging sensor 208 that is substantially beneath the point of contact between waveguide 204 and pliable frustrating layer 206. By collecting and steering radiation towards imaging sensor 208, the operating efficiency of touch sensitivity devices 200 and 270 may be increased. As a result, less powerful radiation sources 202 may be used. Furthermore, by steering more of the FTIR escaped radiation towards imaging sensor 208, the probability of failing to sense contact with devices 200 and 270 may be reduced.

The frustrating layer may be formed from an engineered material having light-steering microstructures formed within or on a surface of the engineered material, with the light-steering microstructures being configured to steer radiation/light in one or more particular directions. Various implementations of such engineered materials and light-steering microstructures for re-directing radiation that escapes from waveguide 204 may be employed within or on a pliable frustrating layer. For example, a reflective coating may be formed on the pliable frustrating layer to reflect radiation that escapes from the waveguide back inside of the device.

Figure 3:
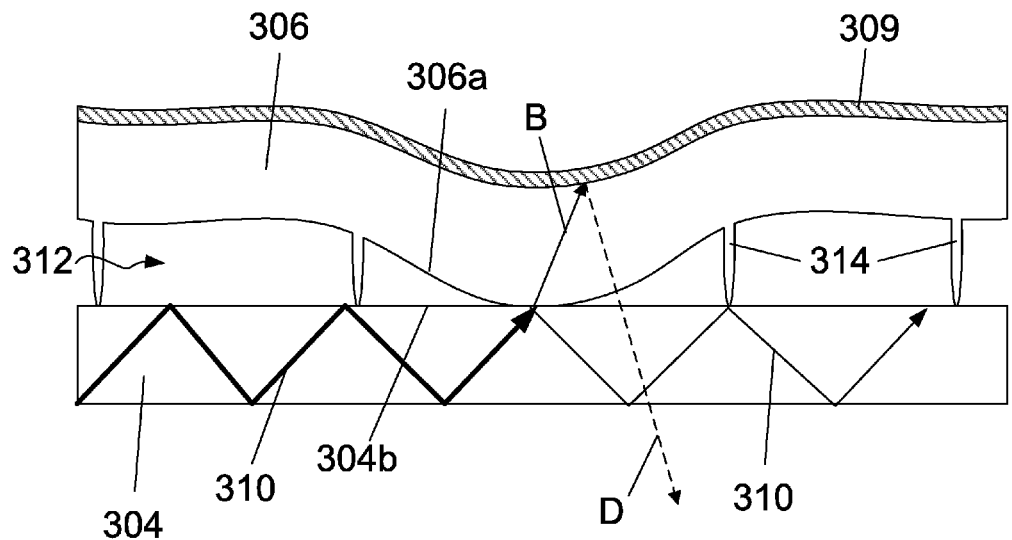
FIGS. 3-13B are schematic cross-sectional diagrams of examples of different frustrating layers for incorporation within a touch sensitive device.

FIG. 3 is a schematic diagram of a cross-section of a waveguide 304 and a pliable frustrating layer 306 on which a reflective layer 309 is formed. Reflective layer 309 may be formed to extend across all of or less than the entire region of pliable frustrating layer 306 with which a user can make contact. Reflective layer 309 is formed of material that is reflective to radiation having a wavelength equal to the wavelength of radiation 310 traveling through waveguide 304. If the device incorporates a display, reflective layer 309 also may be transparent (or at least transmissive) to wavelengths of light emitted by a projection source or backlight (e.g., visible light). In some cases, reflective layer 309 can be formed on a surface of pliable frustrating layer 306 using techniques such as electron beam deposition, thermal evaporation, chemical vapor deposition or sputtering. The 3M corporation of Minnesota makes a number of flexible mirror coatings made of multiple layers of polymers with varying refractive indices. The resulting stack of polymer layers can selectively reflect a range of wavelengths (i.e. a bandpass filter). Such filters can be used to reflect near IR light while leaving the visible light spectrum mostly unaffected.

Protrusions 314 maintain a small gap 312 between pliable frustrating layer 306 and waveguide 304 when an external stimulus is not present. When pressure is applied by an input (not shown) to a portion of pliable frustrating layer 306, pliable frustrating layer 306 is deformed and a surface 306a of pliable frustrating layer 306 comes into substantial contact with a surface 304b of waveguide 304. As a result, at least a portion of the radiation 310 traveling through waveguide 304 undergoes FTIR. The portion of radiation 310 which undergoes FTIR escapes waveguide 304 in multiple directions.

As illustrated in FIG. 3, some of the radiation that escapes waveguide 304 as a consequence of FTIR escapes from the point of contact towards pliable frustrating layer 306 (indicated by arrow "B"). The portions of radiation 310 which escape towards pliable frustrating layer 306 are reflected by reflective layer 309 back inside of the device (as indicated by arrow "D"). The reflected radiation then can be imaged using, for example, an imaging sensor or an imaging layer as illustrated in FIGS. 2A and 2B, respectively.

In addition to, or as an alternative to, forming a reflective layer on a pliable frustrating layer to reflect radiation back inside of the device, the engineered microstructures which are employed on or within frustrating layer and/or light-steering layer include may include diffractive optical elements (DOEs). In general, a DOE structure is a structure that includes a pattern of refractive index variations on the order of a wavelength of light and which primarily diffracts incident radiation. A DOE structure can be generated digitally or recorded optically as an interference pattern between two wavefronts of coherent light. In some implementations, the patterns of refractive index variations in the DOEs may be formed by transferring an interference pattern to a material such that a series of fringes representing intensity minima and maxima of the interference pattern correspond to planes of refractive index variation. For example, interference patterns can be transferred to a recording material using techniques such as interference lithography. The pattern can be represented by either a periodic, random, semi-random or mathematically complex, deterministic variation of refractive index or thickness across one or more different materials. In some cases, the fringes of the transferred interference pattern correspond to a grating structure. Depending on the design and construction, a DOE structure transmits or reflects incident radiation in one or more directions.

DOE structures include a class of structures called holographic optical elements (HOE) that may be considered to fall within two categories: thin hologram structures and thick (volume) hologram structures. In general, thin hologram structures include surface structures or planes of refractive index variation that vary substantially perpendicularly to the surface on which the radiation is incident and can be used to steer a range of wavelengths into one or more particular directions. Thick hologram structures, on the other hand, typically include planes of refractive index variations that run substantially parallel to the surface on which radiation is incident.

Optical modeling software packages are available to facilitate the design of thin or thick hologram structures to direct radiation in a desired direction. CODE V® is one example of such an optical modeling software package that can be used to design thin or thick hologram structures to direct radiation in a desired direction. Other optical modeling software packages also are available.

Figure 4:
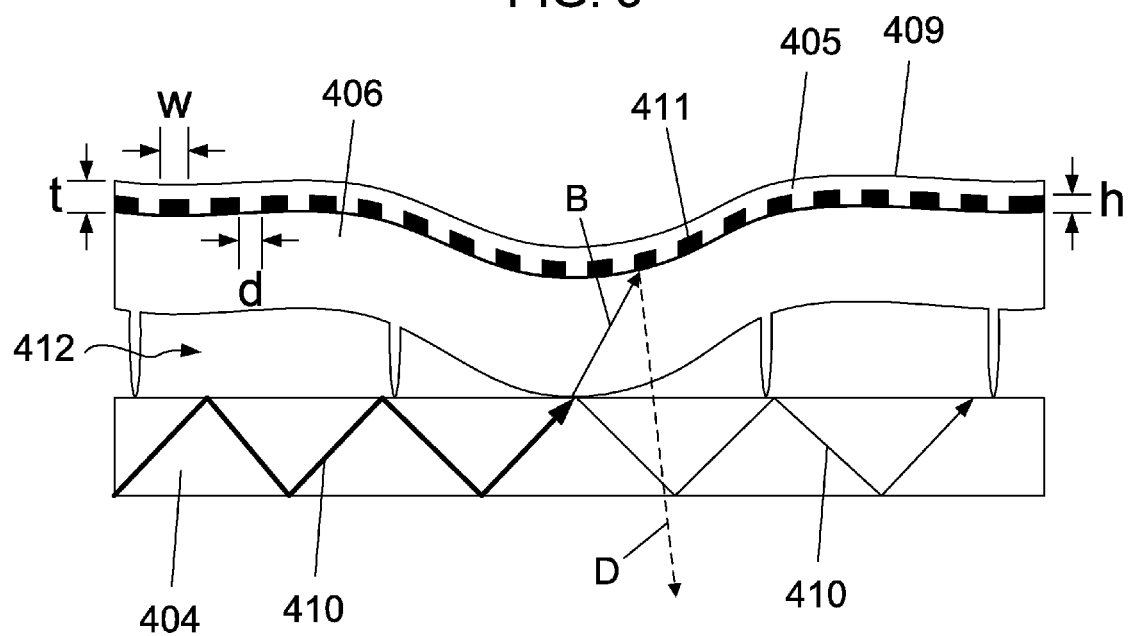

Examples of several different types of thin hologram structures are shown in FIGS. 4-9. The various different frustrating layers illustrated in FIGS. 4-9 can be incorporated within touch sensitive devices, such as, for example, the touch sensitive devices 200 and 270 illustrated in FIGS. 2A and 2B. FIG. 4 is a schematic diagram of a cross-section of a waveguide 404 and a pliable frustrating layer 406 that includes a thin hologram structure 409 on frustrating layer 406. Although not shown, the touch sensitive device also can include additional elements, such as a radiation source, a projection/backlight source, an imaging sensor, and/or an imaging layer. As in previous examples, radiation 410 is guided through waveguide 404 by TIR. When pressure is applied to pliable frustrating layer 406 such that it comes into contact with waveguide layer 404, at least some of radiation 410 will escape (as indicated by arrow "B") waveguide 404 due to FTIR.

In the present implementation, thin hologram structure 409 is formed on a surface of frustrating layer 406 to redirect escaped radiation back into the device (as indicated by arrow "D"). Hologram structure 409 has a 1-bit binary diffraction grating profile (i.e., a square-wave profile) and may be formed from the same material as frustrating layer 406 or from a different material. Hologram 409 may be formed of a series of regularly spaced structures 411 in which each structure 411, having thickness h and width w, is spaced apart from one another by a distance d. Furthermore, the length of structures 411 may extend uniformly across the surface of frustrating layer 406 (i.e., into and out of the page), or it may vary in both directions.

In some cases, hologram structure 409 can include a cladding layer 405. In such implementations, the cladding layer 405 protects grating structures 411 from damage and may fill the spaces between grating structures 411. In addition, cladding layer 405 can be formed to have a thickness t that is greater than thickness h of grating structures 411. Grating structures 411 and cladding layer 405 may be formed from material that is reflective to radiation having a wavelength equal to the wavelength of radiation 410 traveling through waveguide 404. While cladding layer 405 and grating structures may be formed from the same materials with different indices of refraction (e.g., two different types of acrylic, such as polyethylacrylate and polymethylacrylate), cladding layer 405 and grating structures 411 could instead be formed from different materials having different indices of refraction. Similarly, frustrating layer 406 and grating structures 411 can be formed of the same or different materials. If touch sensitive device incorporates a display, grating structures 411 and cladding layer 405 also may be transparent (or at least transmissive) to the wavelengths of radiation (e.g., visible light) used to generate the display. For example, cladding layer can be formed of Teflon (PTFE) or acrylic film.

To reflect radiation that escapes from waveguide 404 as a consequence of FTIR, the spacing and dimensions of grating structures 411 are chosen so as to be on the order of the wavelength of the radiation that escapes from waveguide 404. Radiation reflected by hologram structure 409 may exhibit a diffraction pattern depending on the angle of incidence of the escaped radiation on hologram structure 409. For example, if the escaped radiation is incident normal to layer 409, the angle θ of the diffracted radiation, with respect to the normal, will be given by the following equation:

$$\theta = \pm \sin^{-1}(m\lambda/\Pi)$$

where λ is the wavelength of escaped radiation, m is the diffraction order and Π is the period given by Π=d+w). Accordingly, a diffraction order of m=0 would correspond to specular reflection of normally incident radiation.

Other variations of thin hologram structures having surface-relief profiles also may be incorporated within or added to a frustrating layer to steer radiation in a desired direction. In some cases, it is possible to concentrate most of the radiation into a particular direction (diffractive order) by controlling the cross-section of the grating structures as well as the spacing between the grating structures. Alternatively, or in addition, the grating structures can be designed to produce maximum diffraction efficiency for a specified wavelength of incident radiation. The diffraction efficiency of a hologram corresponds to the amount of light diffracted by the hologram relative to the total amount of light incident on the hologram. The diffraction can be in either reflection or transmission, or in transmission with an additional reflective layer so that the end result is reflection.

Figure 5:
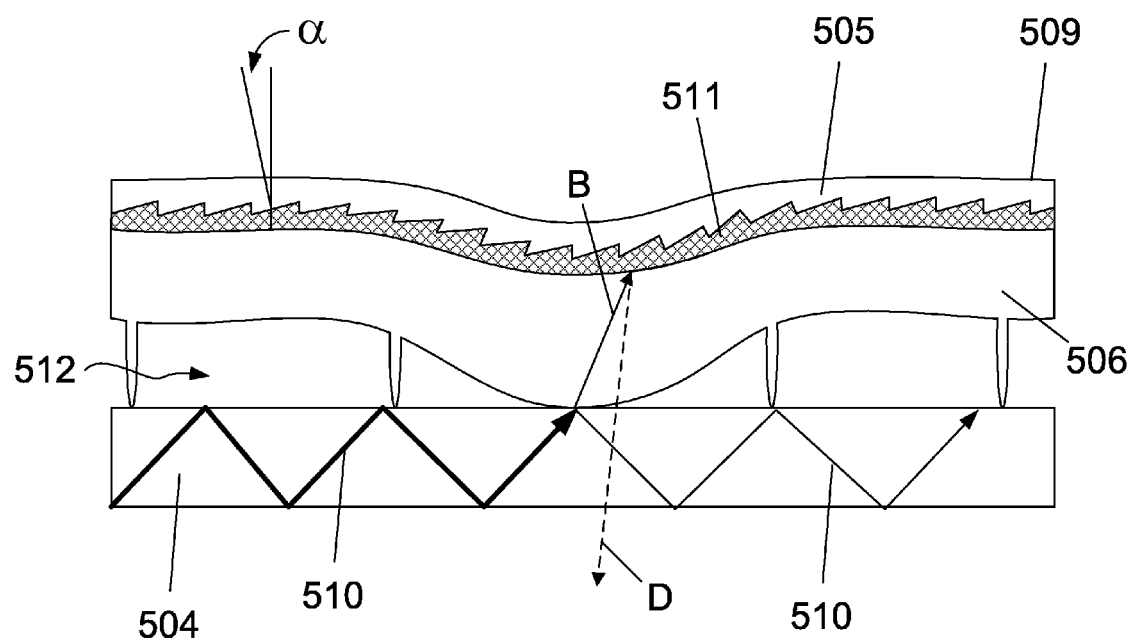

FIG. 5 is a schematic cross-sectional diagram of an example pliable frustrating layer 506 and waveguide 504 for incorporation within a touch sensitive device. Frustrating layer 506 includes a thin hologram structure 509 having blazed gratings 511. As illustrated in FIG. 5, the ridges of the hologram structure 509 form a triangle profile with a blaze angle, α. The blaze angle α is a measure of the blaze slope with respect to a normal to the plane on which the blaze structure 509 is formed. Changing the spacing between the blazed ridges determines the output direction of the reflected radiation (depicted by arrow "D") for any given diffractive order, while changing the blaze angle α affects the efficiency in which incident radiation (depicted by arrow "B") is reflected in a particular diffractive order. As shown in the example of FIG. 5, hologram 509 can be covered with a cladding layer 505. In some implementations, the cladding may incorporate a layer reflective to the waveguide radiation while transmitting the visible light from the display. In this case, if the hologram and cladding layers are otherwise substantially similar in refractive index the visible light would pass through the hologram unaffected while the FTIR radiation would be reflected.

Figure 6:
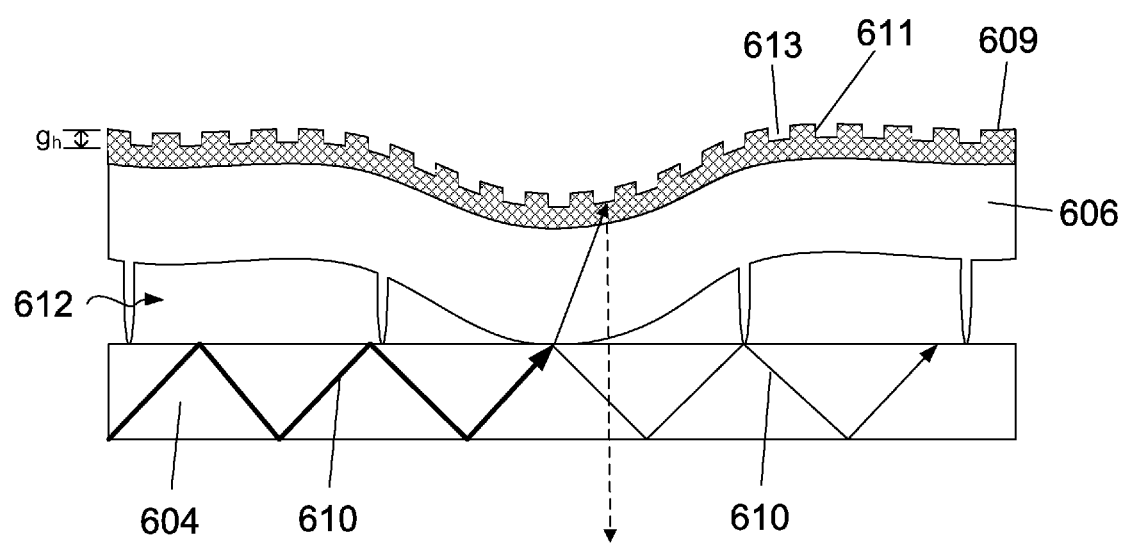

In some implementations, grooves formed in the hologram structure do not extend to the surface of the pliable frustrating layer. For example, FIG. 6 shows a waveguide 604 and pliable frustrating layer 606 on which a thin hologram structure 609 is formed, where the grooves formed in the thin hologram structure 609 do not extend to the surface of pliable frustrating layer 606. As illustrated in FIG. 6, grating layer 609 includes ridges 611 that define grooves 613 with rectangular cross-sections. Each groove 613 has a groove depth $g_h$. In some implementations, the hologram structure 609 shown in FIG. 6 can suppress the occurrence of light that is reflected into other diffractive orders. A cladding layer (not shown) can be formed on a surface of structure 609 to provide a smooth contact surface that does not affect the reflection of radiation from structure 609.

Figure 7:
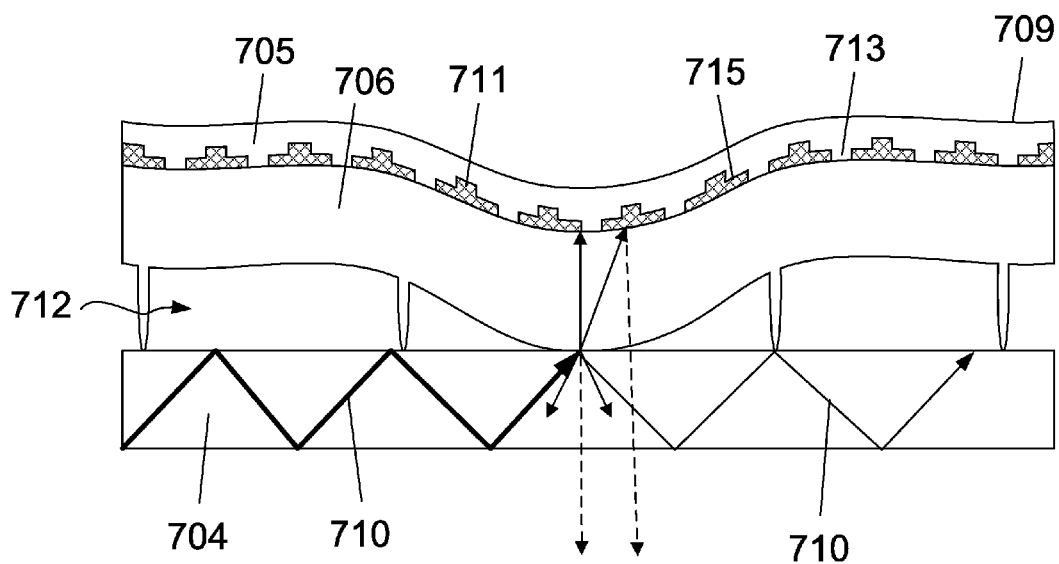

Other variations of thin hologram structures having surface-relief profiles also may be incorporated within or added to a frustrating layer to steer radiation in a desired direction. For example, FIG. 7 shows an example of a waveguide 704 and frustrating layer 706 that includes a hologram structure 709 having a multiple-bit modulated binary profile (i.e., a modified square-wave profile). As illustrated in FIG. 7, the multiple-bit modulated binary profile includes ridges 711 and grooves 713 separated by shelves 715. A cladding layer 705 covers grating layer 709 and fills the openings of grooves 713.

More complex shapes can be built up from these or additional level provided by multiple-bit profiles.

Grating structures formed within or on frustrating layers can have other profile shapes besides binary and blazed profiles. For example, grating structures can be formed to have a sinusoidal profile (i.e., symmetrical, sine-shaped grooves and ridges) or semi-sinusoidal (i.e., symmetrical, half sine-wave grooves or half sine-wave ridges) profile. A wide range of profiles can be fabricated using diamond-turning machines to generate master structures, which can then be replicated. Holographic optical elements can be considered as a generalized case of gratings, where the structure can be periodic, aperiodic, random or noisy, or some combination of these. In addition, they can also vary continuously or discretely (piecewise) across their aperture.

Figure 8:
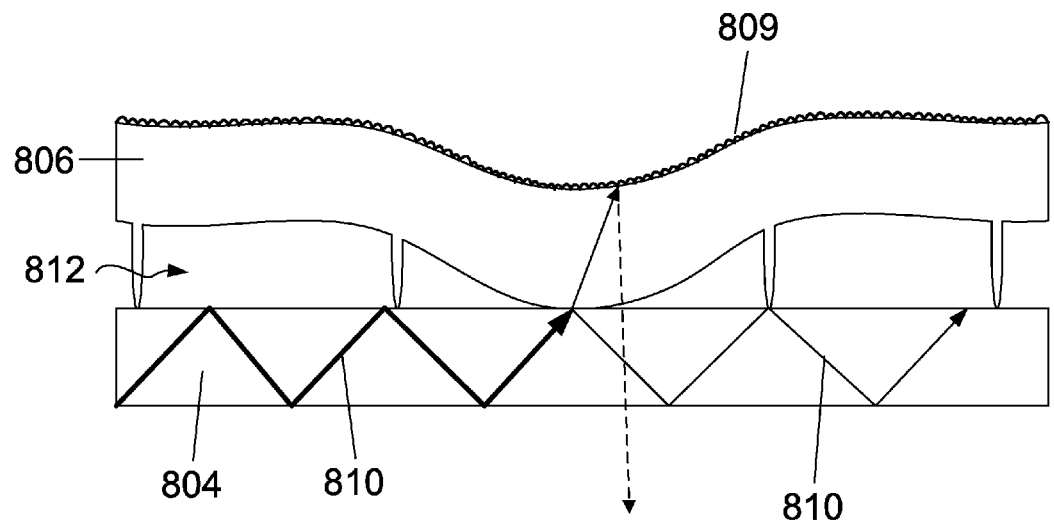

Although the thin hologram structures illustrated in FIGS. 4-7 are periodic, thin film holograms having random/aperiodic structures also can be formed within or on a pliable frustrating layer to reflect escaped radiation back inside of the device. In some cases, the thin film hologram structure includes a diffraction pattern in which fringes of the diffraction pattern are arranged in an aperiodic pattern. The fringes of the diffraction pattern may correspond to regions in which an intensity of light transmitted or reflected by the diffraction pattern is a minima or maxima. Alternatively, or in addition, the fringes may correspond to planes of refractive index variation. Such non-periodic hologram structures may further increase efficiency and/or wavelength selectivity. In some implementations, an aperiodic hologram structure designed to reflect a large portion of escaped radiation in a particular direction can include profiles that are semi-random or random. For example, FIG. 8 shows a waveguide 804 and pliable frustrating layer 806 that includes a thin hologram structure 809 having a random surface pattern. The random surface pattern of structure 809 acts as a diffuser or noise grating with air or other cladding in which incident radiation is exposed to a variation in refractive index. Furthermore, a semi-random diffuser pattern can be designed to reflect the light into a desired range of angles. Two examples of such designed diffusers are the LIGHT SHAPING DIFFUSERS® made by Luminit™ Corporation of Torrence, Calif. and Tailored MICRODIFFUSERS® by Wavefront Technology of Paramount, Calif. Although not required, a cladding layer can be formed on a top surface of the aperiodic structure to provide a smooth contact surface that does not affect the reflection of radiation.

Each of FIGS. 3-8 illustrates a surface-relief structure/reflective layer formed on a surface of the pliable frustrating layer that is opposite from the surface of the pliable frustrating layer that contacts the waveguide layer. As a result, radiation that escapes from the waveguide layer travels through the pliable frustrating layer before reaching the grating/reflective layer(s).

In addition to, or as an alternative to, forming a grating/reflective layer on the surface of the pliable frustrating layer that is opposite from the surface of the pliable frustrating layer that contacts the waveguide layer, a grating/reflective layer also may be formed on the surface of the pliable frustrating layer that contacts the waveguide layer. Such an arrangement can, in some implementations, minimize interference that occurs with the range of wavelengths emitted by a display light.

Figure 9:
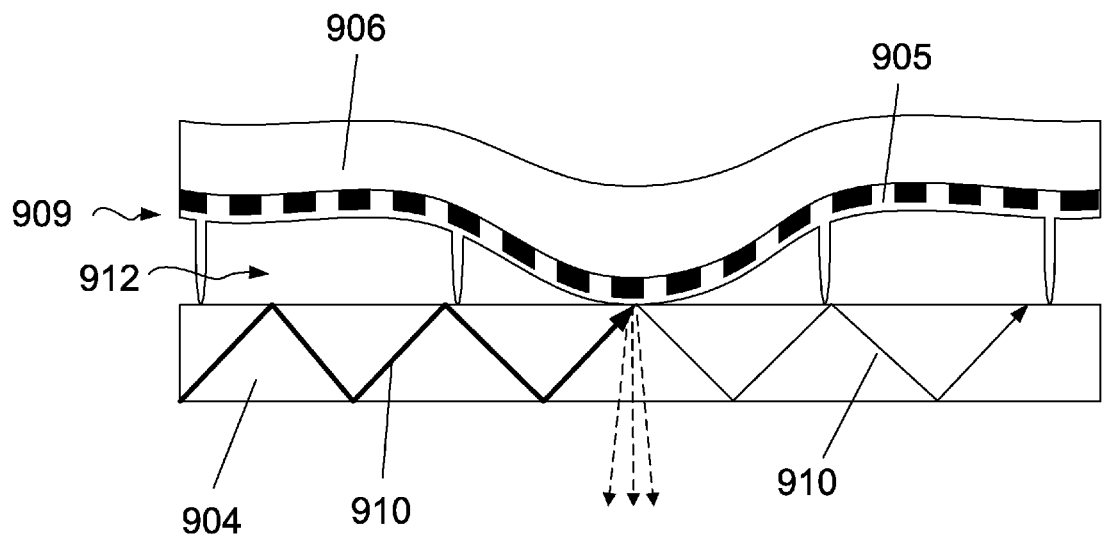

For example, FIG. 9 shows a thin hologram structure 909 formed on a surface of pliable frustrating layer 906 that contacts waveguide 904. Consequently, when radiation 910 escapes waveguide 904 due to FTIR, the escaped radiation encounters thin hologram structure 909 and is reflected back inside of the device (illustrated by dashed arrows) almost immediately without traveling through pliable frustrating layer 906. In addition, in some implementations, the thin hologram structure 909 formed on the surface of pliable frustrating layer may serve to maintain the air gap (when no pressure is applied to frustrating layer 906) between the frustrating layer 906 and waveguide 904 as well as to redirect radiation that escapes from waveguide 904 due to FTIR. Although FIG. 9 illustrates a thin hologram structure 909 having a square wave grating structure profile, thin hologram structures having a wide variety of other grating structure profiles, including, for example, blazed, sinusoidal, semi-sinusoidal, or modified square-wave, can be formed on the surface of the pliable frustrating layer that contacts the waveguide. In some implementations, grating layer 909 may be covered with a cladding layer 905 so as to minimize damage to grating layer 909 as a consequence of contacting waveguide layer 904.

The thin film hologram structures described in connection with FIGS. 3-9 can be formed from the same or a different material than the pliable frustrating layer. For example, diffusers, thin holograms, and gratings are often embossed onto a PET or PC substrate. The embossing shims are made from diamond-turned, digitally or optically generated masters. Another common means of replication is to photo-cure impressions of the structures in resin on a PET or other substrate material.

As discussed above, thick hologram structures are another type of DOE structure that can be formed within or on a frustrating layer to steer radiation that escapes a waveguide due to FTIR when the waveguide comes into contact with the frustrating layer. One characteristic of thick holograms is that the hologram is made up of layers corresponding to a periodic variation of transmittance or refractive index that is, to at least some extent, parallel to the hologram surface on which the radiation is incident. In thick holograms, light is steered by means of Bragg diffraction, i.e., light having the correct wavelength and beam shape (e.g., beam direction, wavefront profile) will be preferentially reflected by the thick hologram whereas other light will be transmitted or absorbed. Thus, in contrast to thin hologram structures, a thick hologram structure serves to reflect a relatively small range of wavelengths across a narrow range of incident angles into a relatively small range of output angles. For example, radiation having a wavelength of 850 nm undergoing FTIR may be reflected by a thick hologram structure towards a normal of the waveguide in which the radiation travels, whereas visible light can travel unaffected through the thick hologram structure. Thick hologram structures can lead to generally higher diffraction efficiency than in thin hologram structures. Diffraction efficiency corresponds to the amount of light diffracted by the hologram relative to the total amount of light incident on the hologram. Thick holograms may be replicated from optically generated masters into photopolymer by contact copying.

Figure 10:
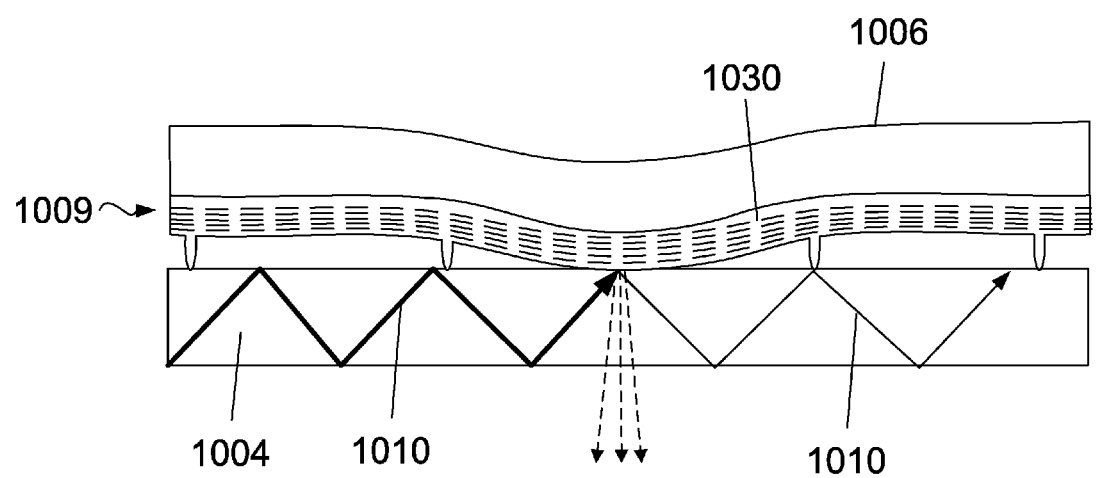

FIG. 10 shows an example of a touch sensitive device that includes a waveguide 1004 and a pliable frustrating layer 1006 having a thick hologram structure 1009. In the present implementation, thick hologram 1009 is formed on a surface of frustrating layer 1006. In some cases, the material of thick hologram 1009 is the same as or different from the material of pliable frustrating layer 1006. As shown in the example of FIG. 10, thick hologram structure 1009 includes layers of refractive index modulated material that form a series of fringe planes 1030. The fringe planes 1030 control the reflection of incident light in a manner similar to a multilayer dielectric film. When radiation 1010 escapes waveguide 1004 due to FTIR, the escaped radiation encounters thick hologram

1009 and is reflected back inside of the device (illustrated by dashed arrows) almost immediately without traveling through pliable frustrating layer 1006. The composition, dimensions, and orientation of the layers of refractive index modulated material in a thick hologram structure can be selected to reflect the incident light at a particular angle. Example materials for a thick hologram structure include bleached silver halide and photopolymer.

Figure 11:
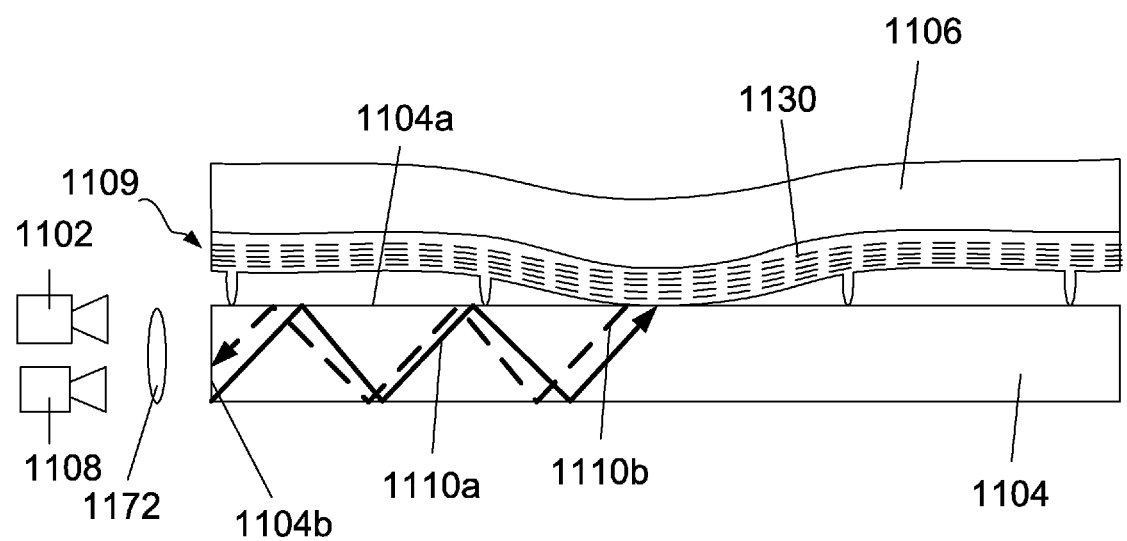

In some implementations, such as that discussed with respect to FIG. 11, a single waveguide may be used to both carry radiation into a multi-touch sensitive device and to recapture and transmit radiation that escapes from the waveguide to an in imaging sensor. In such implementations, a hologram structure (either thin or thick) formed on or within the pliable frustrating layer is configured to reflect radiation that escapes from the waveguide back into the waveguide at an angle such that the reflected radiation again experiences TIR upon returning to the waveguide and is transmitted through the waveguide to an imaging sensor. In some implementations, the hologram structure may be said to function as a retro-reflector in that the hologram structure reflects the escaped radiation back along a vector that is generally parallel to but opposite in direction from the radiation's incident vector. Alternatively, in some cases, the hologram structure reflects the escaped radiation back along a different vector, in which the reflected radiation experiences TIR upon entering the waveguide. In other implementations, the hologram directs the light in a substantially different path within the same waveguide to a camera which is placed separately from the illumination means—for example, along a different edge. Employing the waveguide in this fashion may enable the construction of touch sensitive devices having reduced thicknesses relative to touch sensitive devices that position the image sensor beneath the waveguide, such as, for example, the touch sensitive device 270 illustrated in FIG. 2B.

FIG. 11 is a cross-sectional schematic diagram of a touch sensitive device that includes a pliable frustrating layer 1106 having a thick hologram structure 1109 formed on its bottom surface that operates as a retro-reflector. Radiation 1110a is coupled into waveguide 1104 from source 1102. Upon deformation of pliable frustrating layer 1106, thick hologram structure 1109 comes into contact with waveguide 1104. As a result, a portion of the incident radiation 1110a traveling within waveguide 1104 by means of TIR escapes from waveguide 1104 at the contact point due to FTIR. After this radiation escapes from waveguide 1104, it encounters hologram structure 1109 which reflects at least some of the escaped radiation back into waveguide 1104 which then transmits the reflected radiation 1110b to imaging sensor 1108 due to TIR. Imaging waveguide 1104 is configured to guide the received radiation towards an imaging sensor 1108 located adjacent to edge 1104b.

At least some of the reflected radiation 1110b undergoes TIR when it re-enters waveguide 1104. In some cases, the angle at which radiation 1110b is incident on edge 1104b correlates with the position at which the reflected radiation entered waveguide 1104 at a surface 1104a. Thus, the radiation 1110b incident on imaging sensor 1108 can be processed by any suitable computing system to determine, based on the foregoing correlation, the position along surface 1104a of waveguide 1104 at which the ray of radiation was received. Thus, if the lateral position along surface 1104a at which the radiation was received corresponds to the same general lateral position of the point of contact between waveguide 1104 and frustrating layer 1106, then the corresponding position at which an input contacts the device can be determined. In some implementations, a lens 1172 may be positioned between edge 1104b and sensor 1108 to convert the angle of radiation exiting waveguide 1104 into a position along an imaging surface of sensor 1108. In certain cases, the surface and/or walls of waveguide 1104, in regions outside of the imaging area (i.e., the area in which light can escape waveguide 1104 upon substantial contact with frustrating layer 1106), can be coated or made with material that absorbs radiation having a wavelength substantially equal to the wavelength of radiation emitted by source 1102.

By dividing the thick hologram into a number of sub-holograms, each of which directs light of the desired wavelength into a different direction, it is possible to efficiently "position encode" the light impinging upon FTIR frustrating layer according to its position at the point of incidence on the hologram. Thus, light escaping the waveguide at a point of contact between an input object and the device can be directed toward an imaging sensor or into an imaging waveguide with a direction corresponding to the point of contact.

Figure 12:
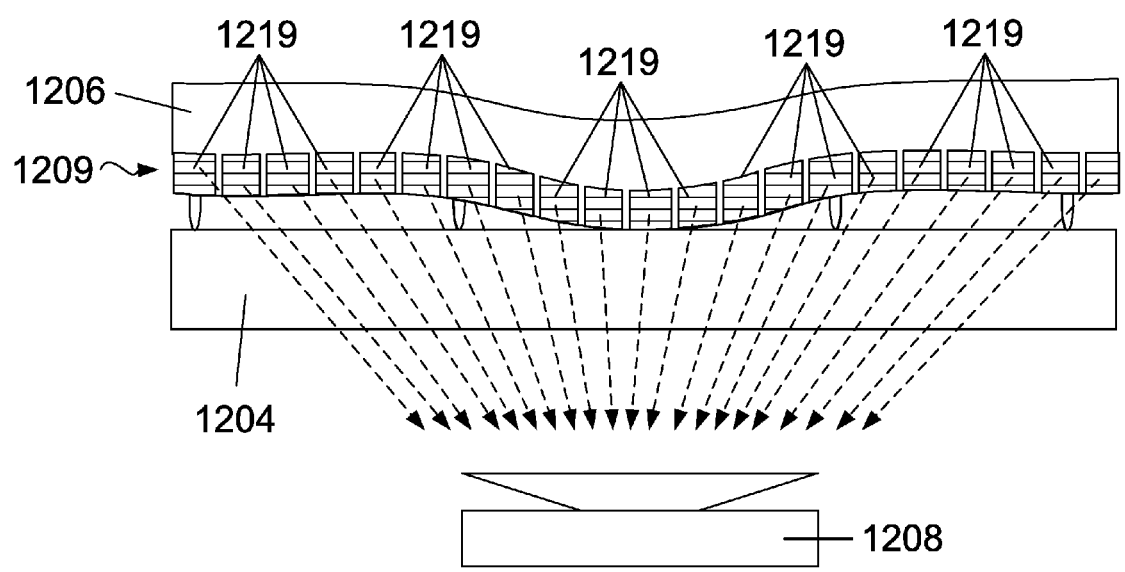

FIG. 12 is a schematic cross-sectional diagram of an example frustrating layer 1206 for incorporation within a touch sensitive device. As shown in the example, a thick hologram 1209 is positioned on a surface of frustrating layer 1206 in which hologram 1209 is divided into multiple sub-holograms 1219. Each sub-hologram 1219 can steer incident radiation that escapes from waveguide 1204, due to FTIR, in a direction (indicated by dashed arrows) towards a location in the device where, for example, one or more imaging sensors 1208 (or an imaging waveguide) may be located. Accordingly, each sub-hologram 1219 can be configured to a have a different respective angle of reflection for a particular wavelength of radiation incident on its surface. The present configuration enables the device to determine where the point of contact with the device is made based on knowledge of the angle at which the escaped radiation impinges on the surface of the imaging sensor (or imaging waveguide).

In addition to, or as an alternative to, reflective layers and DOE structures, refractive optical elements (ROE) also may be formed on or adjacent to the pliable frustrating layer to re-direct radiation that escapes from the waveguide when the pliable frustrating layer contacts the waveguide. In general, ROE structures include a series of elements that are significantly larger than the wavelength(s) of incident radiation and direct radiation primarily by refraction. In some cases, the relatively small amount of diffraction that can occur in ROE structures may compensate for the dispersive properties of the material which forms the FTIR frustrating layer. Depending on the design and construction, an ROE structure can re-direct incident radiation in one or more directions.

Figure 13A:
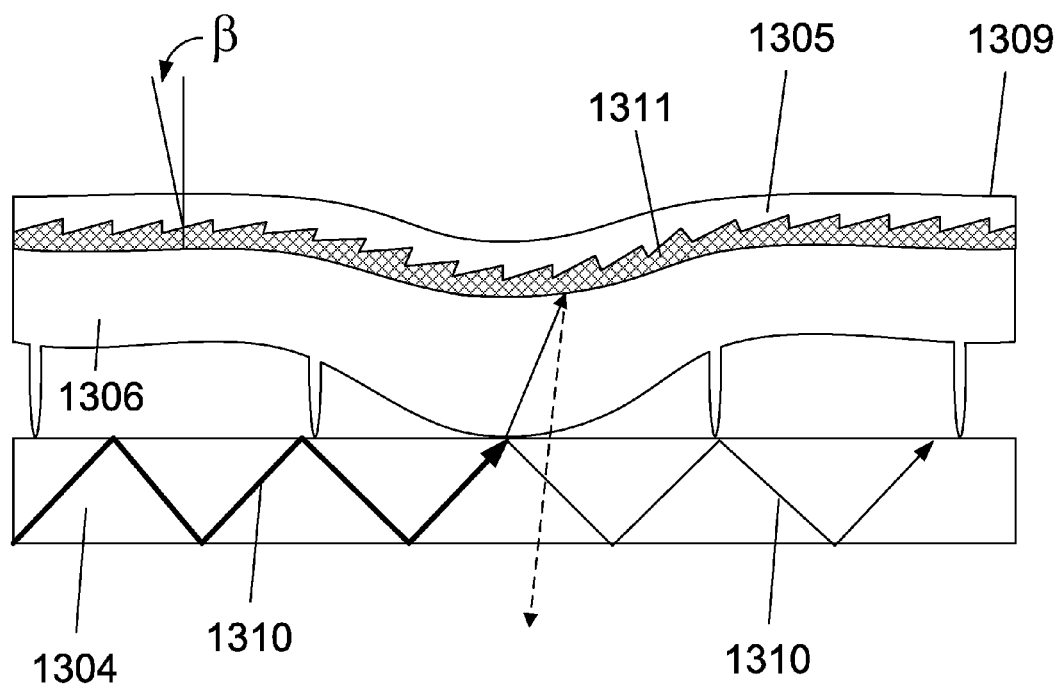

FIG. 13A is a schematic cross-sectional diagram of an example waveguide 1304 and pliable frustrating layer 1306 for incorporation with a touch sensitive device. Frustrating layer 1306 includes an ROE structure 1309, such as a Fresnel prism array, that includes individual Fresnel prism elements 1311. Fresnel prism elements 1311 are similar to the blazed grating structures illustrated in FIG. 5, except that elements 1311 are formed to have dimensions significantly greater than the wavelength of radiation for which re-direction is desired. For example, in the present implementation, the pitch between prism elements 1311 can be on the order of tens of microns to millimeters in size. The ridges of the Fresnel prism elements 1311 can form a triangle profile with an angle, $\beta$, that is a measure of the prism slope with respect to a normal to the plane on which the elements 1311 are formed. Changing $\beta$ can alter the direction of radiation refracted from the structure 1309 for a particular incident angle. Although the example of FIG. 13A illustrates a Fresnel prism structure having a blazed profile, other profiles, such as sinusoidal or saw-tooth, also can be implemented.

In some implementations, a cladding layer 1305 may be disposed on a surface of the prism elements 1311 and may fill the spacing between elements 1311 or other ROE structures. The cladding layer 1305 may be formed of a reflective material to reflect radiation that is refracted through Fresnel elements 1311 back into the device. The cladding layer also can be formed of a material that is transparent (or at least transmissive) to visible light emitted by the display source including, for example, BPMA (p-bromophenacyl methacrylate), polycarbonate, polystyrene, silicones, as well as other resins. In addition, the cladding layer 1305 can protect the Fresnel elements 1311 from damage.

Figure 13B:
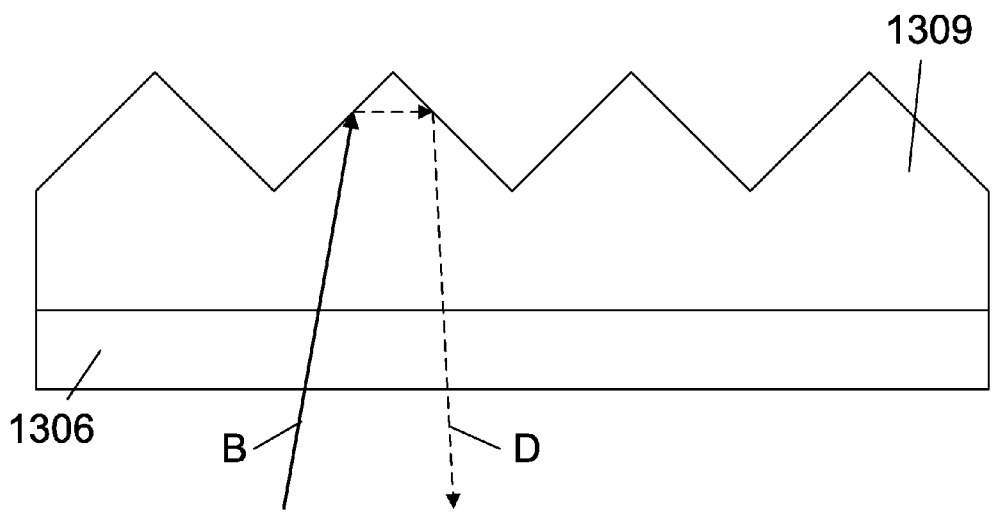

FIG. 13B illustrates a schematic cross-sectional diagram of an example frustrating layer 1306 that includes an ROE structure 1309, in which the ROE structure 1309 has a saw-tooth profile. Radiation (indicated by arrow "B") that escapes a waveguide, due to FTIR, proceeds through frustrating layer 1306 and is incident on one of the sloped surfaces of ROE structure 1309. Depending on the incident angle, the incident radiation can reflect one or more times off the surface of structure 1309 due to total internal reflection and return (as indicated by arrow "D") back toward the device.

ROE structures can be formed integrally with the frustrating layer, i.e., as a single mass of seamless contiguous material or, alternatively, separate from the frustrating layer. In some cases, ROE structures can be laminated to the frustrating layer or placed on the frustrating layer using an optical adhesive (not shown). ROE structures can be formed using materials that include, but are not limited to acrylic, PET, PMMA, TPU or PC substrate. Examples of pre-fabricated ROE structures include VIKUITI™ Thin Brightness Enhancement Films (TBEF) and VIKUITI™ Transmissive Right Angle Films (TRAF), both of which can be purchased from 3M (St. Paul, Minn.).

Each of the light-steering structures/reflective layers described in connection with FIGS. 3-13B can be adhered to a frustrating layer using an optical adhesive having an index of refraction substantially close in value, e.g., within about 0.1, to the index of refraction of both the frustrating layer and the light-steering structure/reflective layer to provide an optical contact between frustrating layer and the light-steering structure/reflective layer. In some implementations, the optical adhesive has an index of refraction substantially close in value, e.g., within about 0.1, to the index of refraction of one or more layers (e.g., a substrate layer) of the light-steering structures/reflective layer. Optical adhesives, for example, may be optically clear pressure sensitive acrylics or silicones. In addition to adhering the frustrating layer to light-steering structures/reflective layer, the presence of the optical adhesive can, in some instances, reduce interference or reflections along undesirable directions (e.g., away from an imaging sensor) that would otherwise occur due to the refractive index contrast at the interface between the ROE structures and the frustrating layer. In particular, air gaps, which have a relatively low refractive index (n=1), may be replaced with optical adhesive having a higher refractive index (n>1). Moreover, in some cases, the optical adhesive fills in roughness between the facing surfaces of the ROE structures and frustrating layer, which may otherwise lead to additional light scattering along undesirable directions (e.g., away from an imaging sensor).

Figure 14:
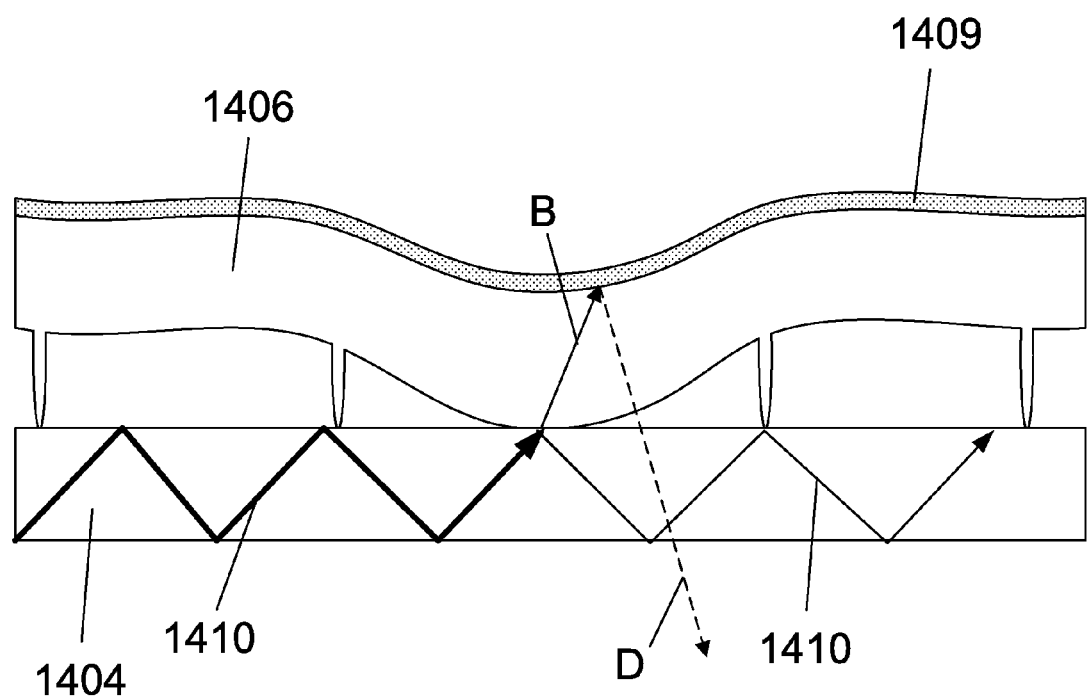
FIGS. 14-15 are schematic cross-sectional diagrams of examples of touch sensitive devices.

In addition to, or as an alternative to, forming a reflective layer, a DOE structure or a ROE structure on a pliable frustrating layer to redirect radiation back inside of the device, the frustrating layer may include a separate diffuser layer. For example, FIG. 14 is a schematic diagram of a cross-section of a waveguide 1404 and a pliable frustrating layer 1406 on which a diffuser layer 1409 is formed. Diffuser layer 1409 may be formed to extend across all of or less than the entire region of pliable frustrating layer 1406 with which a user can make contact. Although shown on a top surface of frustrating layer 1406 away from waveguide layer 1404, diffuser layer 1409 may be formed on a bottom surface of frustrating layer 1406 adjacent to waveguide layer 1404. The diffuser layer can be configured to collect and/or steer radiation escaping waveguide 1404 and incident on frustrating layer 1406 toward an imaging sensor located beneath waveguide layer 1404. In particular, diffuser layer 1409 may cause incident radiation that has escaped from waveguide 1404 (see, e.g., ray "B" in FIG. 14) to scatter in a direction generally beneath a point at which the radiation escapes waveguide 1404 (see, e.g., ray "D" in FIG. 14) or to generally spread in a broad range of directions instead of very limited or specific directions. Diffuser layer 1409 may be formed of material including, but not limited to, PET, PVC, PVB, PMMA or PC. Diffuser layer 1409 may be designed to scatter radiation having a wavelength substantially equal to the wavelength of radiation escaping from waveguide 1404 while allowing light generated by a display device, such as an LCD panel, LED panel or OLED panel, to pass through frustrating layer 1406 and diffuser layer 1409 unobstructed. In some implementations, diffuser layer 1409 has a substantially uniform thickness of about 100 microns, although other thicknesses may be used as well.

In some implementations, diffuser layer 1409 can include surface diffusing structures that are formed on or within a surface of a frustrating layer 1406. In some cases, the surface diffusing structures are formed by roughening a surface of a material in frustrating layer 1409. For example, surface diffusing structures may be formed by roughening a surface of frustrating layer 1406 to form a surface that scatters radiation that has escaped from compliant waveguide 1404 back towards an imaging sensor. Alternatively, or in addition, diffuser layer 1409 can include volume diffusing structures that are formed integrally through at least a portion of the material bulk of frustrating layer 1406. In some cases, diffuser layer 1409 functions as a projection screen layer that serves as a projection screen on to which light emitted by a display device, such as a rear-projection source, is incident so as to form an image. In some implementations, diffuser layer 1409 may be fixed to a surface of frustrating layer 1406. For example, diffuser layer 1409 may be laminated to a surface of frustrating layer 1406 using an adhesive.

Figure 15:
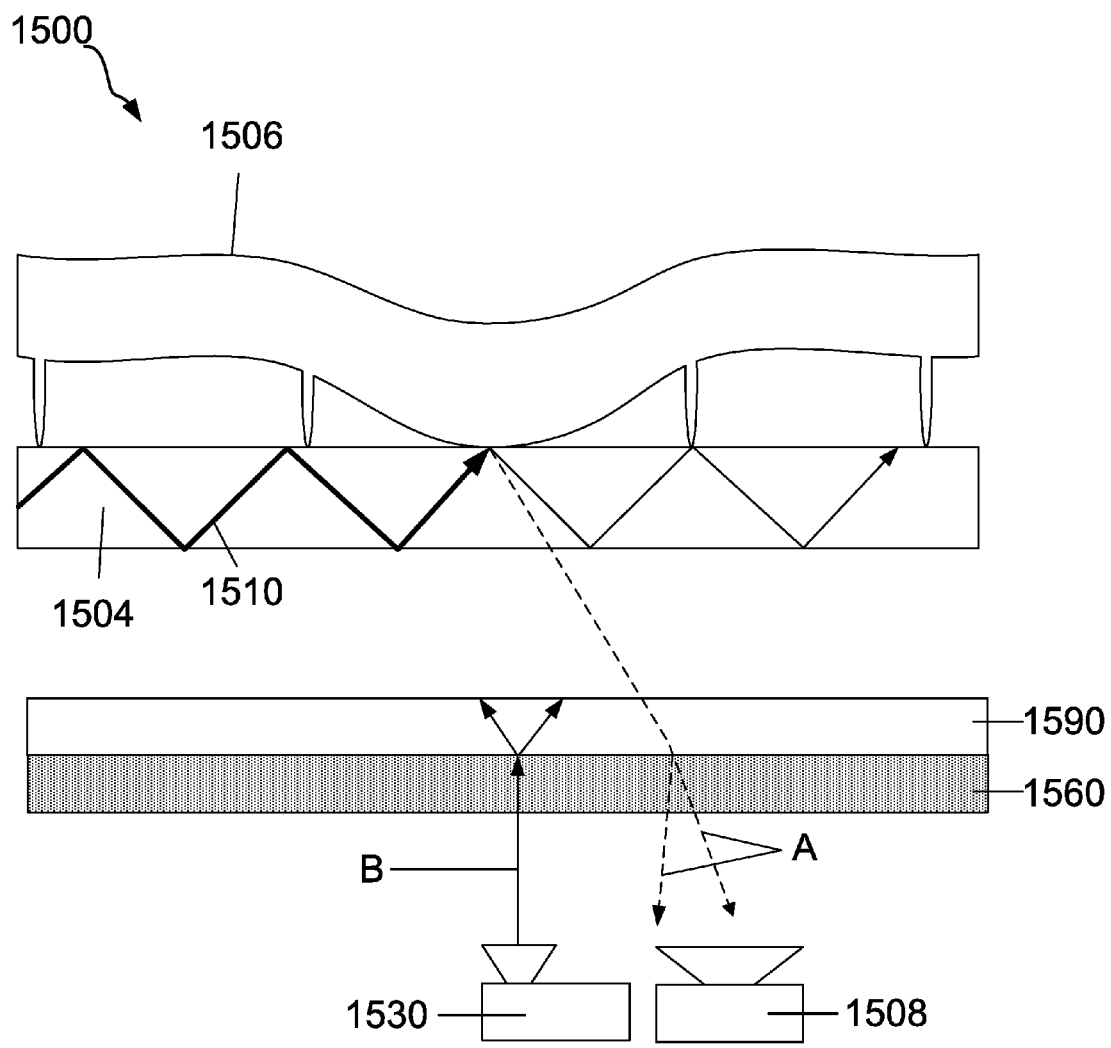

As an alternative or in addition to the foregoing implementations, the touch sensitive device may include a projection screen layer onto which light from a display device is imaged. For example, FIG. 15 is a schematic cross-section diagram of a touch-sensitive device 1500 that includes a waveguide layer 1504 through which radiation 1510 is traveling by TIR, a pliable frustrating layer 1506, a display device 1530 and a projection screen layer 1590. Projection screen layer 1590 may include a diffuser layer (e.g., surface diffusing structures or volumetric diffusing structures), DOE structures or ROE structures (e.g., fresnel lenses). Projection screen layer 1590 may be formed of materials including, but not limited to glass, PMMA, PET, PC, PVC, TPU, or TAC. In some implementations, touch sensitive device 1500 also may include, but does not require, a separate light-steering layer 1560 adjacent to projection screen layer 1590 for steering or redirecting radiation that has escaped from waveguide 1504 due to FTIR upon contact with frustrating layer 1506. Light-steering layer 1560 may include DOE structures or ROE structures (e.g., fresnel lenses). Light-steering layer 1560 may be formed of materials including, but not limited to glass, PMMA, PET, PC, PVC, TPU, or TAC. Both light-steering layer 1460 and projection screen layer 1490 may films such as Alpha and Beta screens, which are commercially available from DNP Denmark AS.

As shown in the example of FIG. 15, visible light (indicated by arrow "B") emitted from display device 1530 (e.g., a projection source such as a video projector) is emitted towards a top surface of touch sensitive device 1500 (i.e., toward frustrating layer 1506 and waveguide 1504) and is incident on light-steering layer 1560. Due to the diffusive properties of projection screen layer 1590, the visible light is diffused and imaged onto projection screen layer 1590 forming an image visible to a user viewing device 1500. In some cases, the light-steering structures, which are incorporated in light-steering layer 1560, may be configured to diffuse radiation (e.g., IR radiation) that has escaped from waveguide 1504 due to FTIR upon contact with frustrating layer 1506. For example, as shown in FIG. 15, radiation (indicated by arrow "A") which escapes waveguide 1504 passes through projection screen layer 1590 and is incident on light-steering layer 1560. Light-steering layer 1560, which includes light-steering structures, then redirects the incident radiation toward one or more imaging sensors 1508, after which the radiation is detected by one or more image sensors 1508.

Alternatively, light-steering layer 1560 may include two alternative types of light-steering structures: a first set of light-steering structures configured to diffuse visible light and a second set of light-steering structures configured to redirect the radiation which has escaped from waveguide 1504. In some implementations, light-steering layer 1560 does not include light-steering structures configured to redirect radiation that has escaped waveguide 1504. Instead, such light-steering structures may be formed on or within frustrating layer 1506.

Alternatively, in implementations in which light-steering layer 1560 is not included in the touch-sensitive device, visible light emitted from display device 1530 is incident on projection screen layer 1590 and diffuses to form an image visible to a user viewing device 1500. In some cases, light-steering structures may be employed on or within projection screen layer 1590 to redirect radiation (e.g., IR radiation) that has escaped from waveguide 1504 due to FTIR upon contact with frustrating layer 1506. For example, projection screen layer 1590 may include two alternative types of light-steering structures: a first set of light-steering structures configured to diffuse visible light and a second set of light-steering structures configured to redirect the radiation which has escaped from waveguide 1504.

In some implementations, projection screen layer 1590 and light-steering layer 1560 are bonded or laminated together. The bonding/lamination can be performed using an adhesive, such as an optical adhesive, to provide optical contact between projection screen layer 1590 and light-steering layer 1560. Alternatively, or in addition, projection screen layer 1590 may be bonded to frustrating layer 1506 using an adhesive such as, for example, an optical adhesive. In some cases, an air gap may be present between frustrating layer 1506 and projection screen layer 1590 and/or between projection screen layer 1590 and light-steering layer 1560.

A number of implementations have been described. Nevertheless, various modifications may be made. For example, although many of the implementations disclosed herein are described as employing LCD technology to generate output images, OLED or LED technology could be substituted for the LCD technology employed in each of these disclosed implementations to generate the output images. OLEDs and LEDs both generally are emissive elements. Therefore, in implementations that employ OLED or LED technology to generate output images, there may be no need for a backlight. Accordingly, other implementations are within the scope of the following claims.

What is claimed is:

1. A touch-screen device comprising:
    a radiation source;
    an optical waveguide configured to receive radiation emitted by the radiation source and to cause at least some of the received radiation to undergo total internal reflection within the optical waveguide;
    a pliable frustrating layer disposed relative to the optical waveguide such that a small gap exists between the pliable frustrating layer and the optical waveguide so as to enable the pliable frustrating layer to contact the optical waveguide when the pliable frustrating layer is physically deformed, the pliable frustrating layer being configured to:
        cause frustration of the total internal reflection of the received radiation within the optical waveguide at a contact point between the pliable frustrating layer and the optical waveguide when the pliable frustrating layer is physically deformed to contact the optical waveguide such that some of the received radiation undergoing total internal reflection within the optical waveguide escapes from the optical waveguide at the contact point via frustrated total internal reflectance;
    a display device fixed to a bottom surface of the optical waveguide;
    an imaging sensor configured to detect at least some of the radiation that escapes from the optical waveguide, the imaging sensor embedded in the display device;
    a coupling layer configured to couple radiation out of the display device, the coupling layer in contact with a side of the display device, the side furthest from the optical waveguide;
    a structure comprising a diffraction pattern, the structure disposed on a surface of the pliable frustrating layer that is furthest from the optical waveguide, the structure being configured to steer at least a portion of the radiation that escapes from the optical waveguide toward the imaging sensor; and
    a cladding layer positioned on a surface of the pliable frustrating layer;
    wherein portions of the cladding layer are located within one or more grooves defined by the structure;
    wherein the optical waveguide is in optical contact with the display device;
    wherein the structure comprises a reflective layer that is reflective to radiation that escapes from the optical waveguide; and
    wherein the reflective layer transmits visible light.

2. The touch-screen device of claim 1 wherein the structure comprises a diffuser layer.

3. The touch-screen device of claim 1 wherein the diffraction pattern corresponds to a grating structure.

4. The touch-screen device of claim 3 wherein the grating structure includes at least one of a blazed grating profile, a square-wave profile, a 1-bit binary diffraction grating profile, a multiple-bit modulated binary profile, a sinusoidal profile, and a half-sinusoidal profile.

5. The touch-screen device of claim 1 wherein the diffraction pattern is aperiodic.

6. The touch-screen device of claim 1 wherein the radiation source is configured to emit infrared light.

7. The touch-screen device of claim 1 wherein the structure is configured to steer by diffraction at least a portion of the radiation that escapes from the optical waveguide toward the imaging sensor.

8. The touch-screen device of claim 1 wherein the structure is configured to steer by refraction at least a portion of the radiation that escapes from the optical waveguide toward the imaging sensor.

9. The touch-screen device of claim 8 wherein the structure comprises an array of prisms.

10. The touch-screen device of claim 1 wherein the structure is configured to steer by scattering at least a portion of the radiation that escapes from the optical waveguide toward the imaging sensor.

11. The touch-screen device of claim 1 wherein the structure is divided into substructures and each sub-structure is configured to steer radiation that escapes from the optical waveguide toward the imaging sensor.

12. The touch-screen device of claim 1 wherein the display device is a liquid crystal device.

13. The touch-screen device of claim 1 wherein the display device is a rear-projection light source.

14. The touch-screen device of claim 1 wherein the display device is a light emitting diode device.

15. The touch-screen device of claim 14 wherein the light emitting diode is an organic light emitting diode device.

16. The touch-screen device of claim 1 further comprising a plurality of imaging sensors, each imaging sensor being configured to detect at least some of the radiation that escapes from the optical waveguide.

17. The touch-screen device of claim 1 further comprising a projection screen layer, wherein the projection screen layer comprises a structure configured to diffuse at least a portion of light emitted from the display device.

18. The touch-screen device of claim 1 further comprising a projection screen layer and a structure configured to diffuse at least a portion of light emitted from the display device on to the projection screen layer.

19. A touch-screen device comprising:
   a radiation source;
   an optical waveguide configured to receive radiation emitted by the radiation source and to cause at least some of the received radiation to undergo total internal reflection within the optical waveguide;
   a pliable frustrating layer disposed relative to the optical waveguide such that a small gap exists between the pliable frustrating layer and the optical waveguide so as to enable the pliable frustrating layer to contact the optical waveguide when the pliable frustrating layer is physically deformed, the pliable frustrating layer being configured to: cause frustration of the total internal reflection of the received radiation within the optical waveguide at a contact point between the pliable frustrating layer and the optical waveguide when the pliable frustrating layer is physically deformed to contact the optical waveguide such that some of the received radiation undergoing total internal reflection within the optical waveguide escapes from the optical waveguide at the contact point via frustrated total internal reflectance;
   an image generating layer fixed to a bottom surface of the optical waveguide;
   an imaging sensor configured to detect at least some of the radiation that escapes from the optical waveguide, the imaging sensor embedded in the image generating layer;
   a coupling layer configured to couple radiation out of the image generating layer, the coupling layer in contact with a side of the image generating layer, the side furthest from the optical waveguide;
   a cladding layer positioned on a surface of the pliable frustrating layer;
   a structure comprising a diffraction pattern, the structure disposed on a surface of the pliable frustrating layer that is furthest from the optical waveguide, the structure being configured to:
      redirect at least a portion of the radiation that escapes from the optical waveguide back into the waveguide at an angle that enables the reflected radiation to undergo total internal reflection in the optical waveguide;
   wherein portions of the cladding layer are located within one or more grooves defined by the structure;
   wherein the optical waveguide is in optical contact with the image generating layer;
   wherein the structure comprises a reflective layer that is reflective to radiation that escapes from the optical waveguide; and
   wherein the reflective layer transmits visible light.

20. The touch-screen device of claim 19 wherein the bottom surface of the optical waveguide is opposite to a top surface of the optical waveguide, the image generating layer having a top surface facing the bottom surface of the optical waveguide and a bottom surface that is opposite from the top surface of the image generating layer and the image generating layer being configured to emit output images towards the optical waveguide and pliable frustrating layer and to be transmissive to radiation emitted by the radiation source.

21. The touch-screen device of claim 20 wherein the image generating layer comprises a liquid crystal device.

22. The touch-screen device of claim 20 wherein the image generating layer comprises a rear-projection light source.

23. The touch-screen device of claim 20 wherein the image generating layer comprises a light emitting diode.

24. The touch-screen device of claim 23 wherein the light emitting diode is an organic light emitting diode.

25. A touch-screen device comprising:
   a radiation source;
   an optical waveguide configured to receive radiation emitted by the radiation source and to cause at least some of the received radiation to undergo total internal reflection within the optical waveguide;
   a pliable frustrating layer disposed relative to the optical waveguide such that a small gap exists between the pliable frustrating layer and the optical waveguide so as to enable the pliable frustrating layer to contact the optical waveguide when the pliable frustrating layer is physically deformed, the pliable frustrating layer being configured to:
      cause frustration of the total internal reflection of the received radiation within the optical waveguide at a contact point between the pliable frustrating layer and the optical waveguide when the pliable frustrating layer is physically deformed to contact the optical waveguide such that some of the received radiation undergoing total internal reflection within the optical waveguide escapes from the optical waveguide at the contact point via frustrated total internal reflectance;
   a display device fixed to a bottom surface of the optical waveguide;
   a cladding layer positioned on a surface of the pliable frustrating layer;
   an imaging sensor configured to detect at least some of the radiation that escapes from the optical waveguide, the imaging sensor embedded in the display device; and a coupling layer configured to couple radiation out of the display device, the coupling layer in contact with a side of the display device, the side furthest from the optical waveguide; wherein the frustrating layer comprises a structure disposed on a surface of the pliable frustrating layer that is furthest from the optical waveguide, the structure configured to steer at least a portion of the radiation that escapes from the optical waveguide toward the imaging sensor;

wherein portions of the cladding layer are located within one or more grooves defined by the structure;

wherein the optical waveguide is in optical contact with the display device;

wherein the structure comprises a reflective layer that is reflective to radiation that escapes from the optical waveguide; and wherein the reflective layer transmits visible light.

26. The touch-screen device of claim 25 wherein the structure comprises a diffraction pattern corresponding to a grating structure.

27. The touch-screen device of claim 26 wherein the grating structure includes at least one of a blazed grating profile, a square-wave profile, a 1-bit binary diffraction grating profile, a multiple-bit modulated binary profile, a sinusoidal profile, and a half-sinusoidal profile.

28. The touch-screen device of claim 25 wherein the structure comprises an aperiodic diffraction pattern.

29. The touch-screen device of claim 25 wherein the structure comprises a diffraction pattern in which planes of refractive index variation are aligned substantially parallel with a surface of the pliable frustrating layer on which the radiation is incident.

30. The touch-screen device of claim 25 wherein the radiation source is configured to emit infrared light.

31. The touch-screen device of claim 25 wherein the structure is configured to steer by diffraction at least a portion of the radiation that escapes from the optical waveguide toward the imaging sensor.

32. The touch-screen device of claim 25 wherein the display device is a liquid crystal device.

33. The touch-screen device of claim 25 wherein the display device is a rear-projection light source.

34. The touch-screen device of claim 25 wherein the display device is a light emitting diode device.

35. The touch-screen device of claim 34 wherein the light emitting diode is an organic light emitting diode device.

36. The touch-screen device of claim 25 further comprising a plurality of imaging sensors, each imaging sensor being configured to detect at least some of the radiation that escapes from the optical waveguide.

37. The touch-screen device of claim 25 wherein the structure is further configured to diffuse at least a portion of light emitted from the display device.

38. The touch-screen device of claim 25 wherein the structure comprises a volume diffusing structure or a surface diffusing structure.

39. The touch-screen device of claim 38 wherein the structure is further configured to diffuse at least a portion of light emitted from the display device to produce an image on the pliable frustrating layer.

* * * * *